United States Patent
Chen et al.

(10) Patent No.: US 12,451,430 B2
(45) Date of Patent: Oct. 21, 2025

(54) METHOD OF FABRICATING SEMICONDUCTOR DEVICES HAVING DIFFERENT ARCHITECTURES AND SEMICONDUCTOR DEVICES FABRICATED THEREBY

(71) Applicant: TAIWAN SEMICONDUCTOR MANUFACTURING COMPANY, LTD., Hsinchu (TW)

(72) Inventors: Chung-Hui Chen, Hsinchu (TW); Cheng-Hsiang Hsieh, Hsinchu (TW); Wan-Te Chen, Hsinchu (TW); Tzu Ching Chang, Hsinchu (TW); Wei Chih Chen, Hsinchu (TW); Ruey-Bin Sheen, Hsinchu (TW); Chin-Ming Fu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 648 days.

(21) Appl. No.: 17/196,240

(22) Filed: Mar. 9, 2021

(65) Prior Publication Data

US 2021/0375762 A1    Dec. 2, 2021

Related U.S. Application Data

(60) Provisional application No. 63/031,409, filed on May 28, 2020.

(51) Int. Cl.
*H01L 23/528* (2006.01)
*G06F 30/392* (2020.01)
(Continued)

(52) U.S. Cl.
CPC ........ *H01L 23/5286* (2013.01); *G06F 30/392* (2020.01); *G06F 30/3953* (2020.01); *G06F 30/398* (2020.01); *H01L 23/5283* (2013.01)

(58) Field of Classification Search
CPC ............. H01L 23/5286; H01L 23/5283; G06F 30/392; G06F 30/398; G06F 30/3953
See application file for complete search history.

(56) References Cited

U.S. PATENT DOCUMENTS

| 7,260,442 B2 | 8/2007 | Hwang et al. |
| 9,256,709 B2 | 2/2016 | Yu et al. |

(Continued)

FOREIGN PATENT DOCUMENTS

| DE | 10 2019 116 939 | 1/2020 |
| DE | 10 2019 106 763 | 4/2020 |

(Continued)

OTHER PUBLICATIONS

Office Action dated Nov. 15, 2021 for corresponding application No. TW 11021117610. (pp. 1-3).

(Continued)

*Primary Examiner* — Nathan W Ha
(74) *Attorney, Agent, or Firm* — Hauptman Ham, LLP

(57) ABSTRACT

A method of manufacturing a semiconductor device based on a dual-architecture-compatible design includes: forming transistor components of in a transistor (TR) layer; and performing one of fabricating additional components according to (A) a buried power rail (BPR) type of architecture or (B) a non-buried power rail (non-BPR) type of architecture. The step (A) includes, in corresponding sub-TR layers, forming various non-dummy sub-TR structures, and, in corresponding supra-TR layers, forming various dummy supra-TR structures which are corresponding first artifacts. The step (B) includes, in corresponding supra-TR layers, (Continued)

forming various non-dummy supra-TR structures and forming various dummy supra-TR structures which are corresponding second artifacts, the first and second artifacts resulting from the dual-architecture-compatible design being suitable to adaptation into the BPR type of architecture.

20 Claims, 19 Drawing Sheets

(51) Int. Cl.
*G06F 30/3953* (2020.01)
*G06F 30/398* (2020.01)

(56) References Cited

U.S. PATENT DOCUMENTS

| | | | |
|---|---|---|---|
| 10,102,324 | B2 | 10/2018 | Oriordan et al. |
| 2014/0040838 | A1 | 2/2014 | Liu et al. |
| 2015/0145041 | A1 | 5/2015 | Divakaruni et al. |
| 2015/0278429 | A1 | 10/2015 | Chang |
| 2017/0331031 | A1 | 11/2017 | Bak et al. |
| 2020/0135718 | A1 | 4/2020 | Liebmann et al. |
| 2023/0064525 | A1* | 3/2023 | Hsu ............... G06F 30/392 |

FOREIGN PATENT DOCUMENTS

| | | |
|---|---|---|
| EP | 3343614 | 4/2018 |
| KR | 20160021726 | 2/2016 |
| KR | 20180109836 | 10/2018 |
| KR | 20190024538 | 3/2019 |
| TW | 201921454 | 6/2019 |
| WO | 2020066797 | 4/2020 |

OTHER PUBLICATIONS

Notice of Allowance dated Apr. 29, 2022 for corresponding case No. KR 10-2021-0059532. (pp. 1-7) English abstract attached on p. 1.

\* cited by examiner

100
semiconductor device

104
non-BPR-architecture region having
non-dummy & dummy supra-TR structures
and
dummy sub-TR structures

106
BPR-architecture region having
dummy supra-TR structures
and
non-dummy sub-TR structures

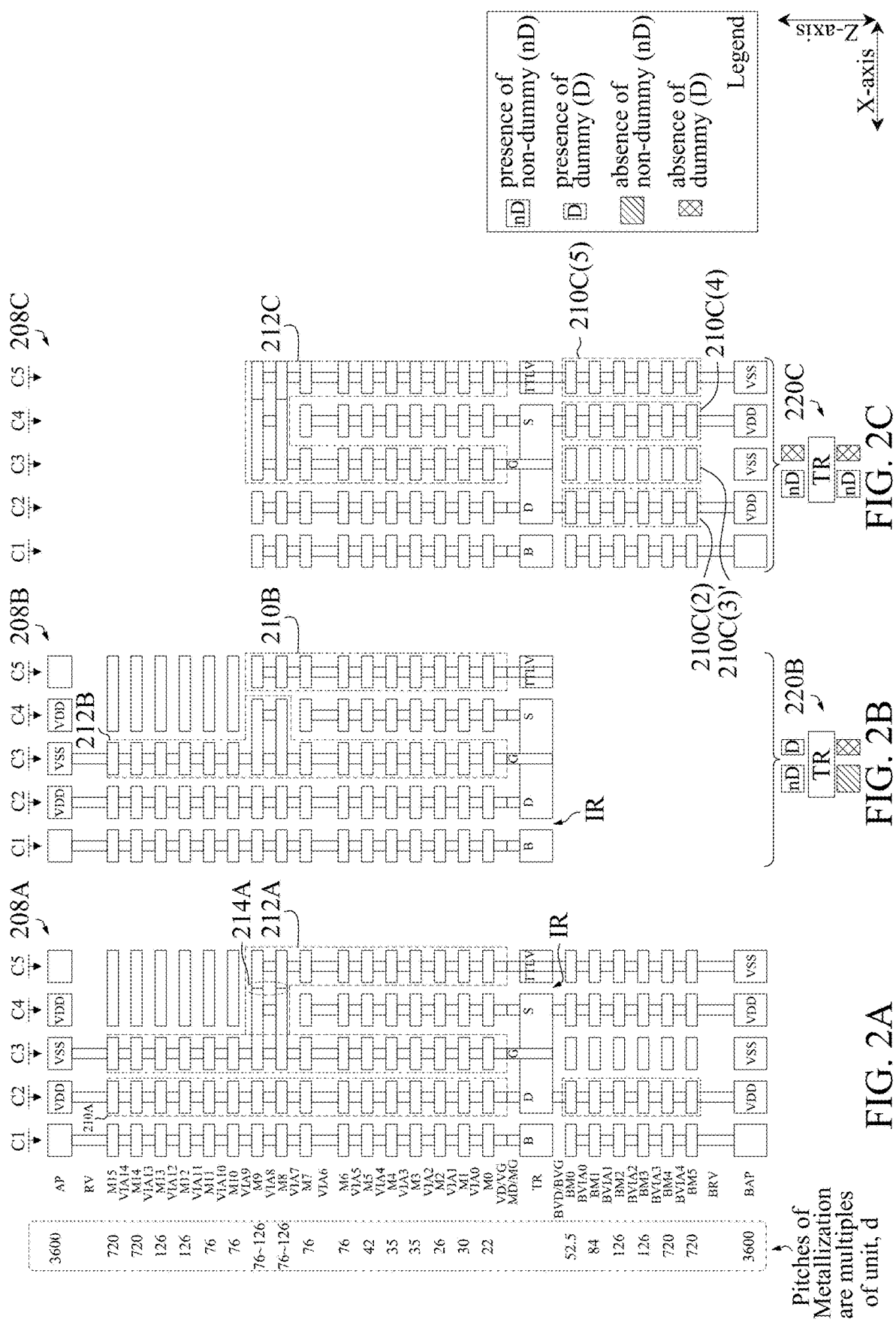

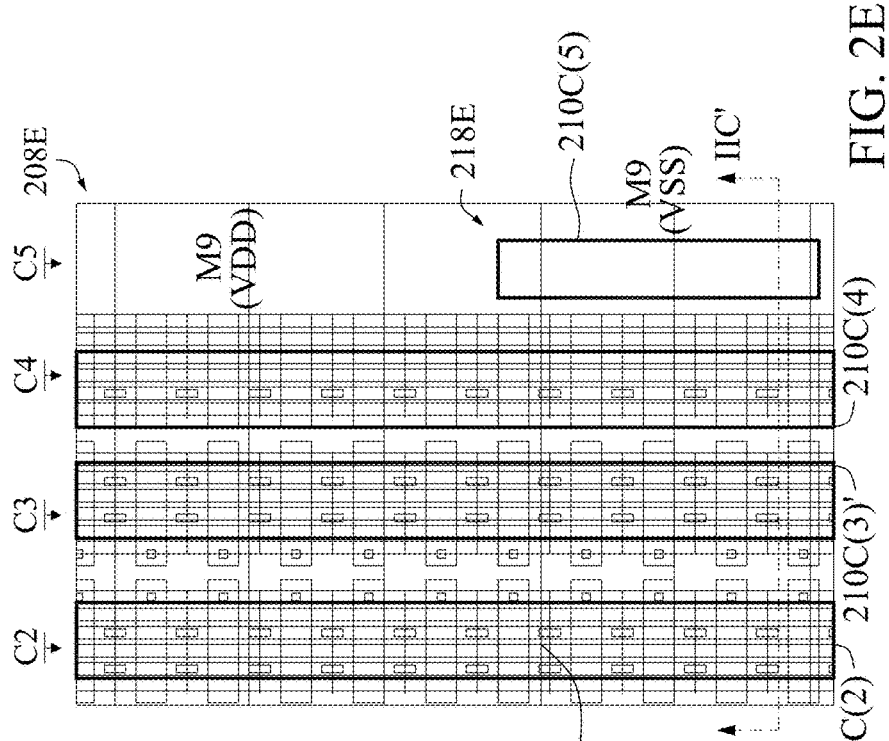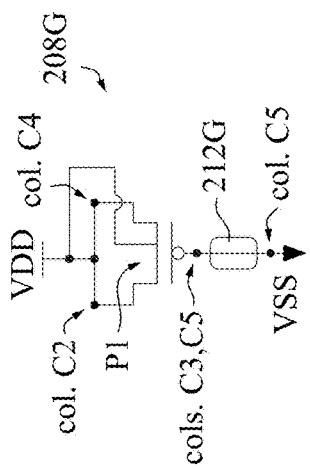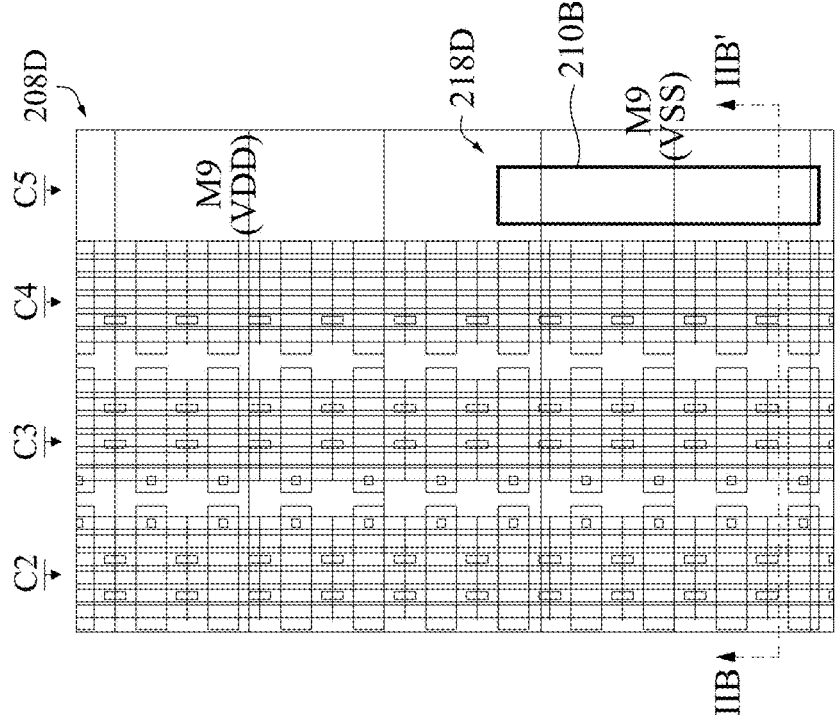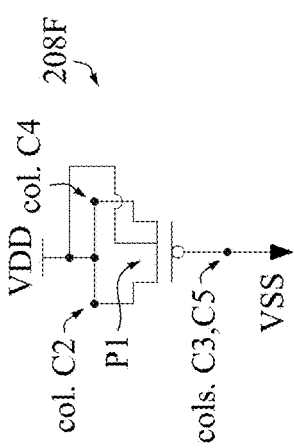

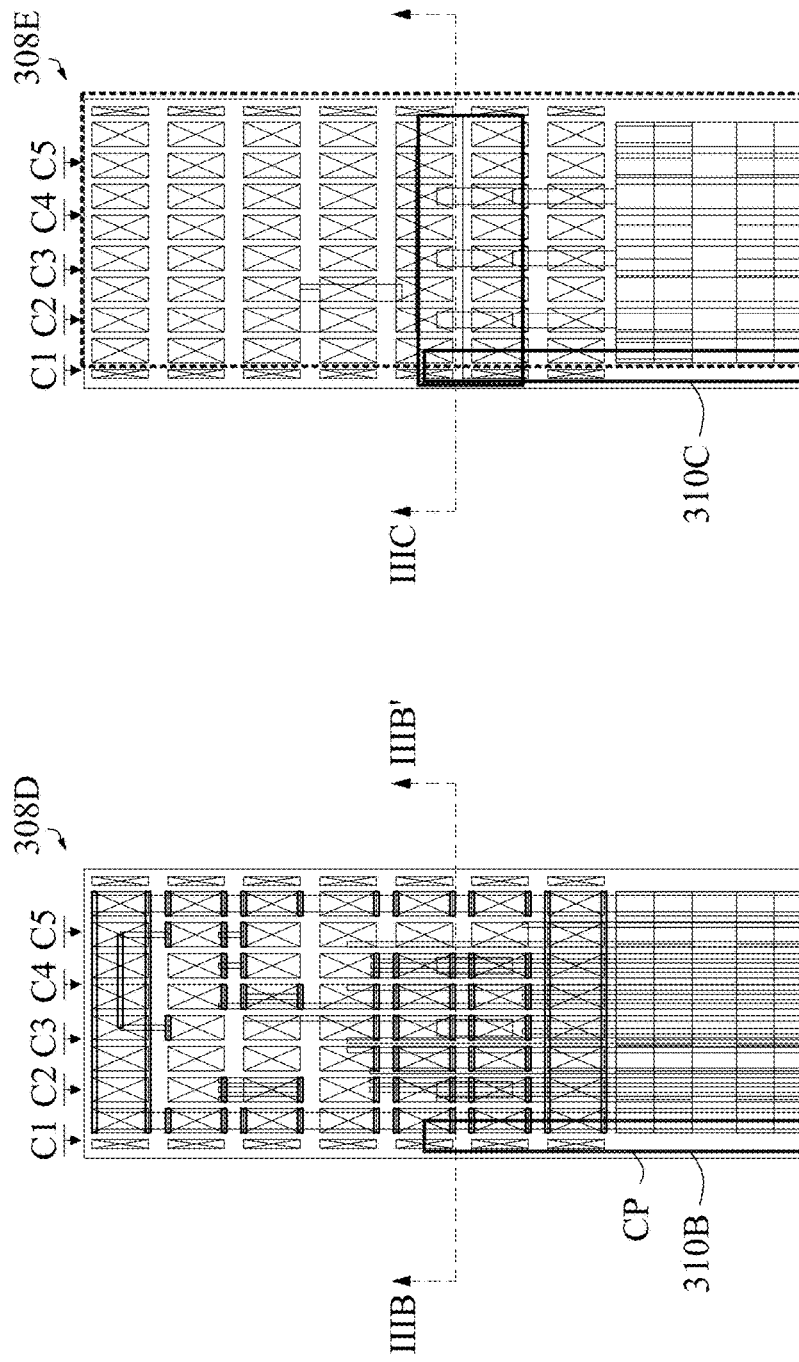
FIG. 3E
FIG. 3G
FIG. 3D
FIG. 3F

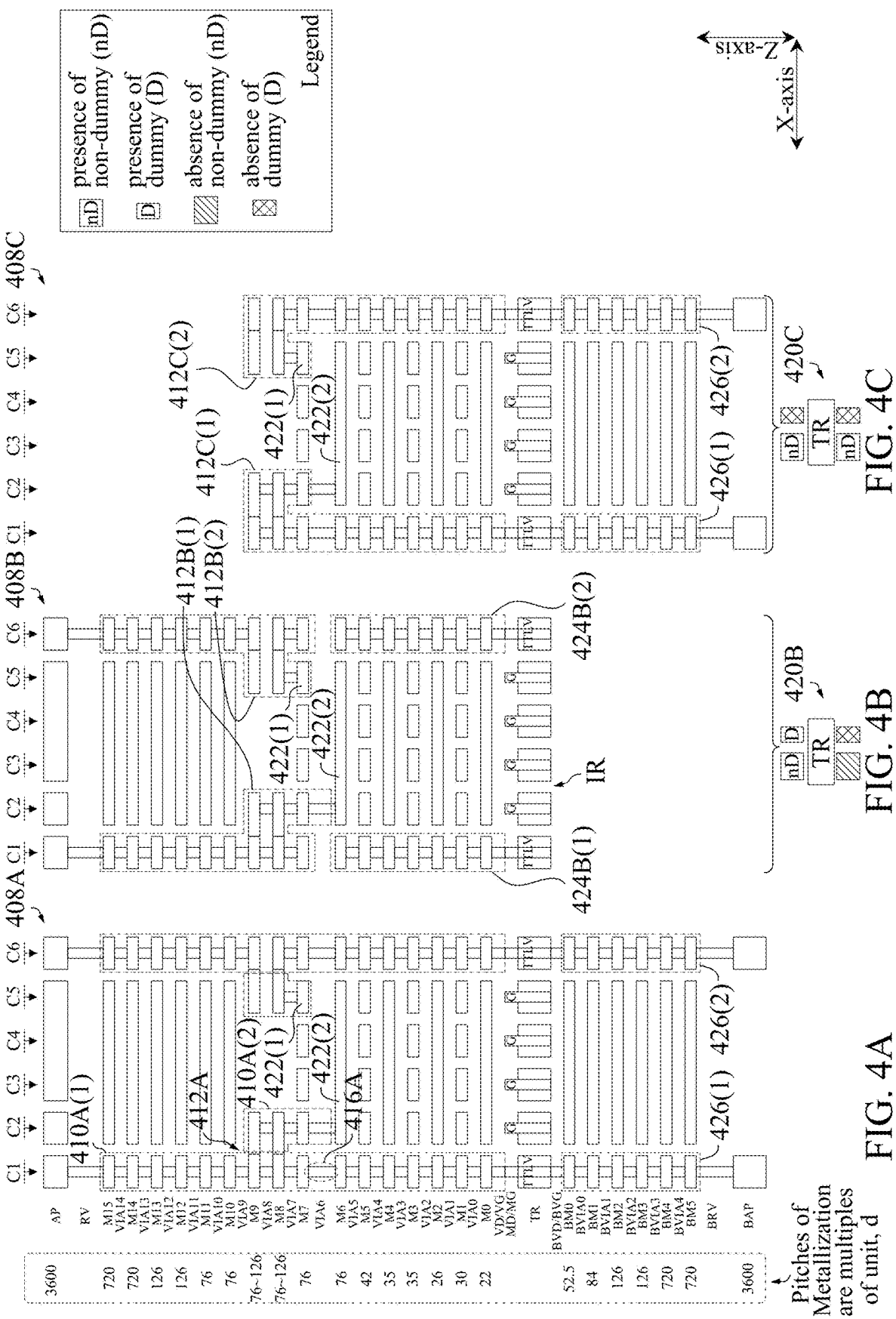

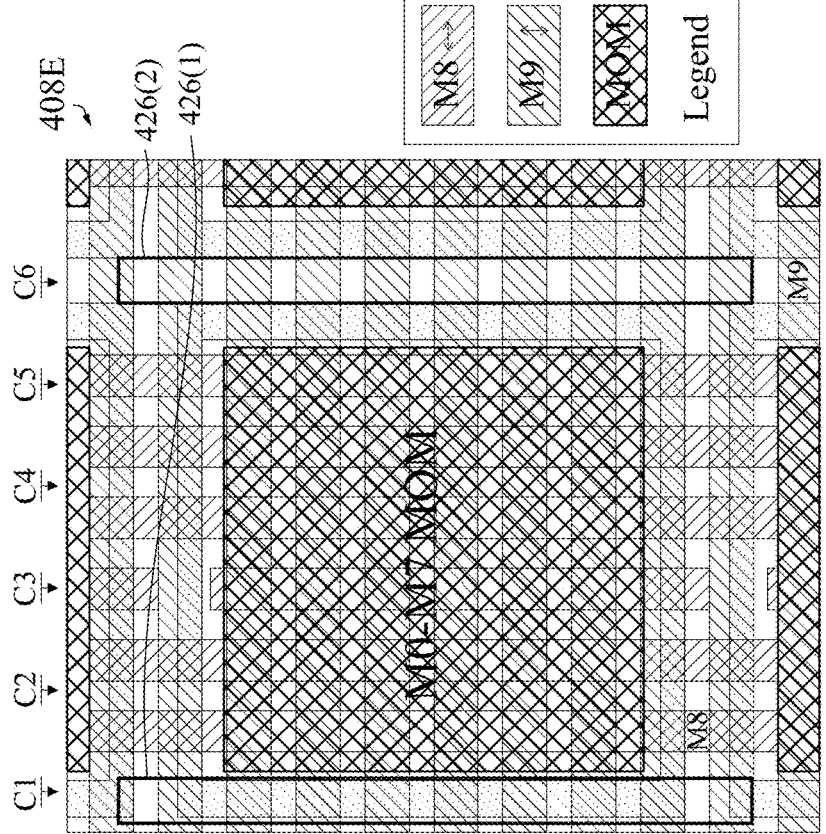
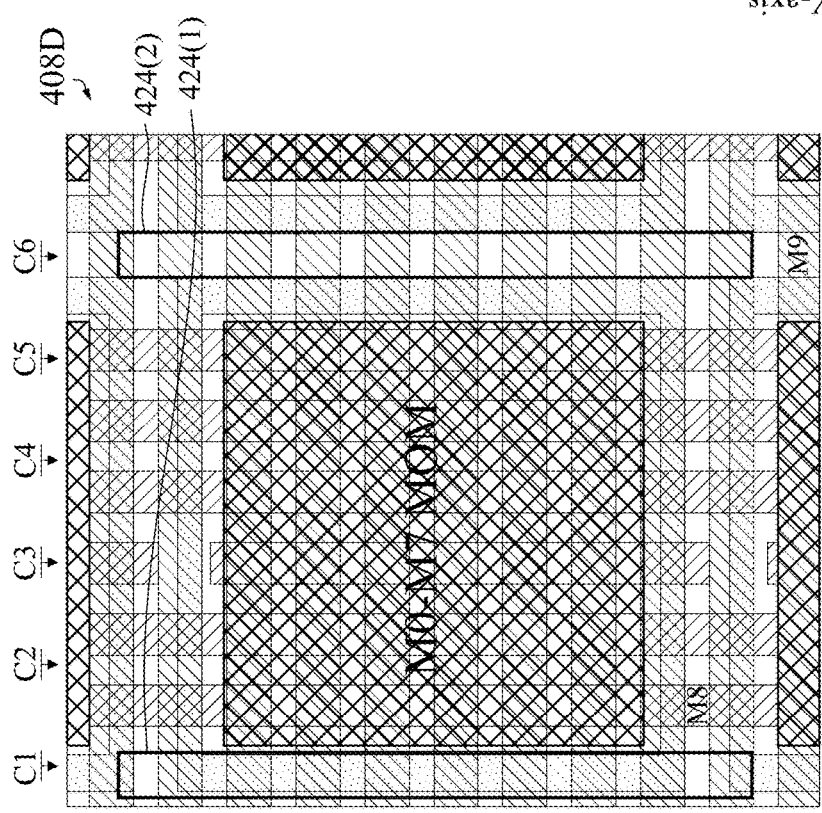
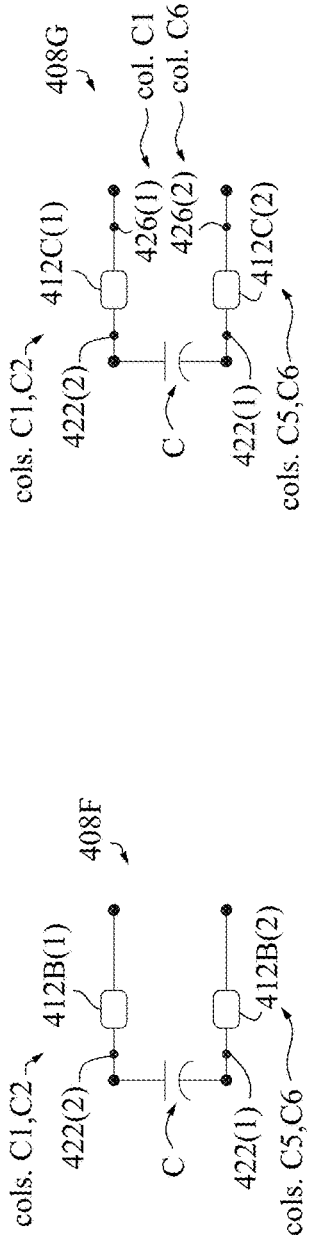
FIG. 4D
FIG. 4E
FIG. 4F
FIG. 4G

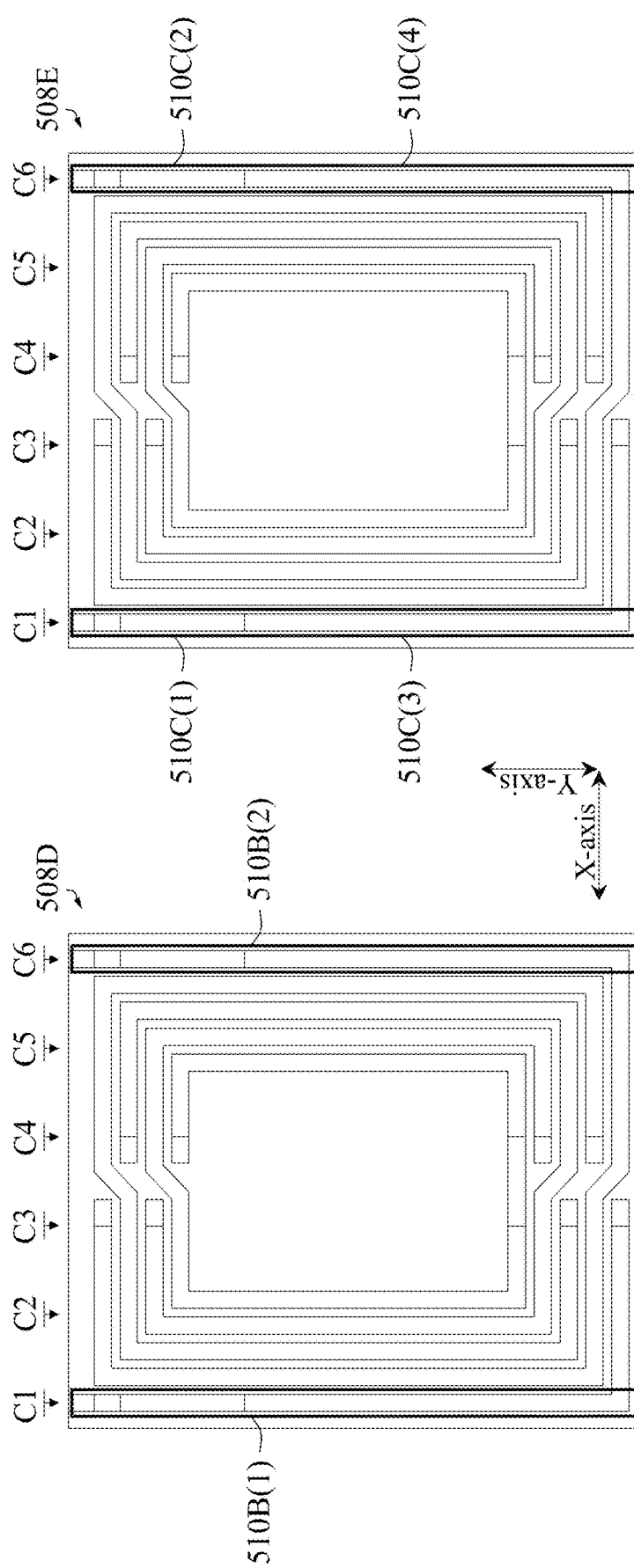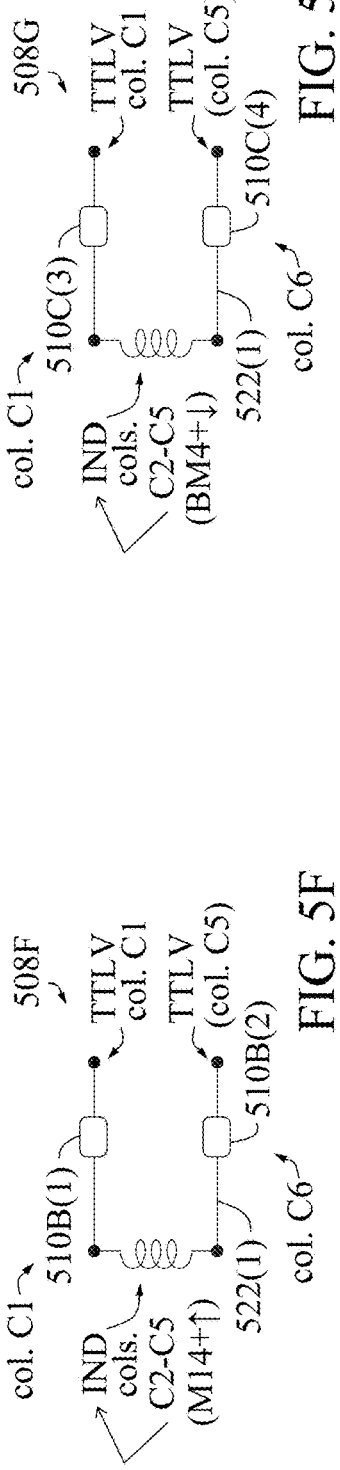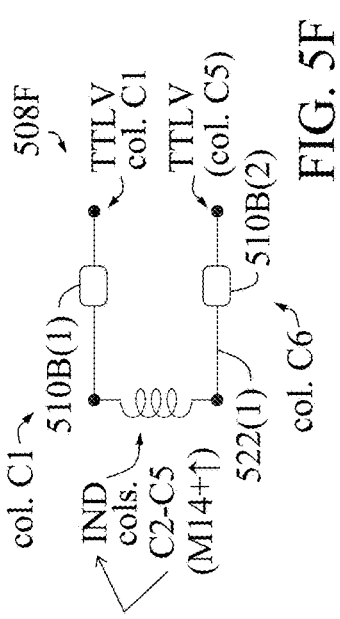

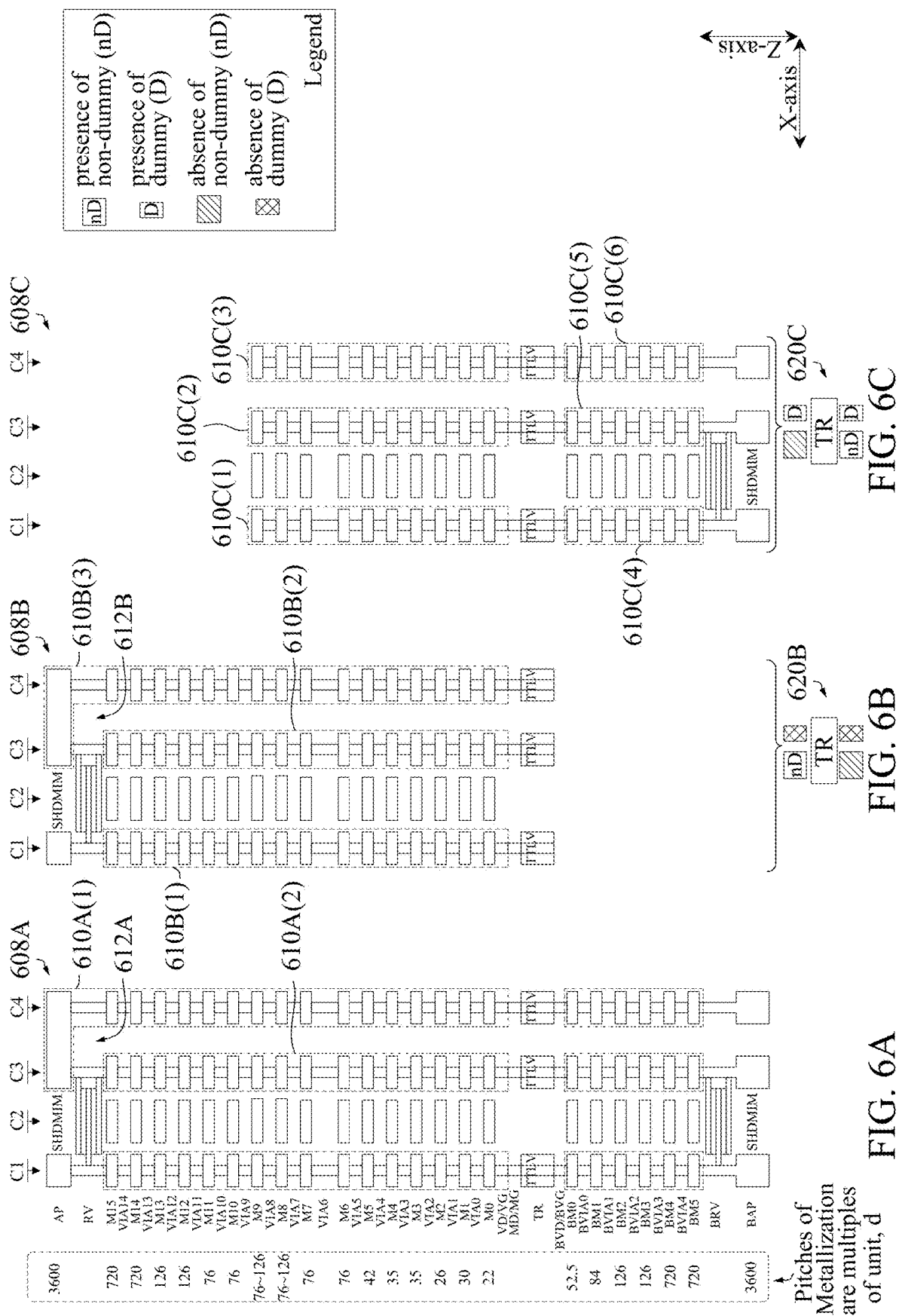

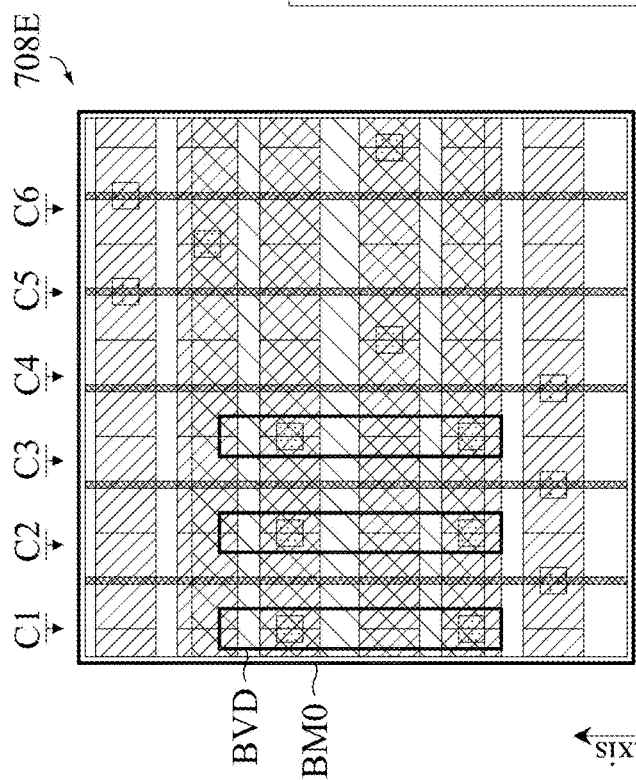
FIG. 7E
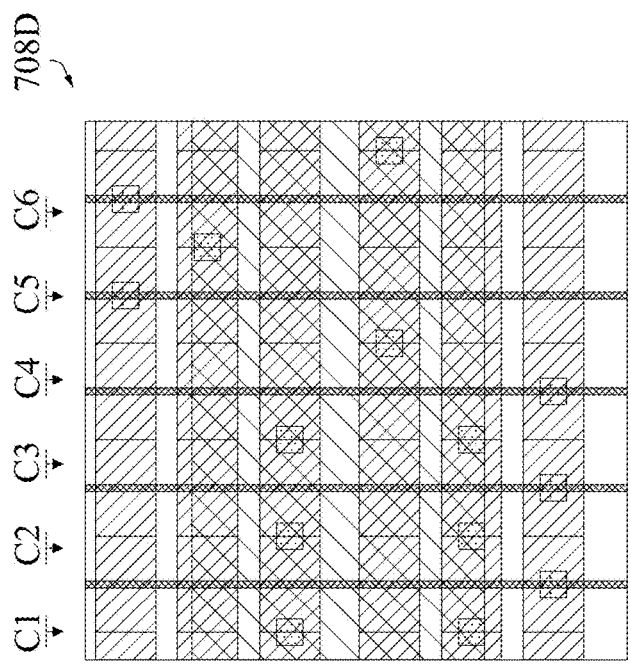
FIG. 7D
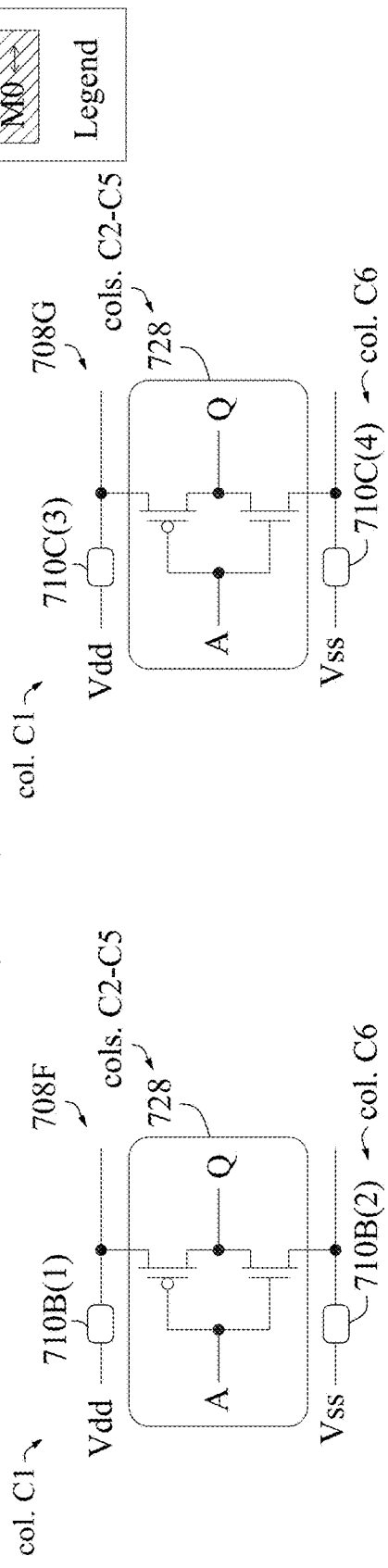
FIG. 7G
FIG. 7F

METHOD OF FABRICATING SEMICONDUCTOR DEVICES HAVING DIFFERENT ARCHITECTURES AND SEMICONDUCTOR DEVICES FABRICATED THEREBY

PRIORITY CLAIM AND CROSS-REFERENCE

The present application claims the priority of U.S. Provisional Application No. 63/031,409, filed May 28, 2020, which is incorporated herein by reference in its entirety.

BACKGROUND

An integrated circuit ("IC") includes one or more semiconductor devices. One way in which to represent a semiconductor device is with a plan view diagram referred to as a layout diagram. Layout diagrams are generated in a context of design rules. A set of design rules imposes constraints on the placement of corresponding patterns in a layout diagram, e.g., geographic/spatial restrictions, connectivity restrictions, or the like. Often, a set of design rules includes a subset of design rules pertaining to the spacing and other interactions between patterns in adjacent or abutting cells where the patterns represent conductors in a layer of metallization.

Typically, a set of design rules is specific to a process/technology node by which will be fabricated a semiconductor device based on a layout diagram. The design rule set compensates for variability of the corresponding process/technology node. Such compensation increases the likelihood that an actual semiconductor device resulting from a layout diagram will be an acceptable counterpart to the virtual device on which the layout diagram is based.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 2A, 2B and 2C are corresponding cross sections, FIGS. 2D and 2E are corresponding layout diagrams, and FIGS. 2F and 2G are corresponding circuit diagrams, in accordance with some embodiments.

FIGS. 3D and 3E are corresponding layout diagrams, in accordance with some embodiments. FIGS. 3F and 3G are corresponding circuit diagrams, in accordance with some embodiments.

FIGS. 4A, 4B and 4C are corresponding cross sections, and FIGS. 4D and 4E are corresponding layout diagrams, in accordance with some embodiments. FIGS. 4F and 4G are corresponding circuit diagrams, in accordance with some embodiments.

FIGS. 5D and 5E are corresponding layout diagrams, in accordance with some embodiments. FIGS. 5F and 5G are corresponding circuit diagrams, in accordance with some embodiments.

FIGS. 6A, 6B and 6C are corresponding cross sections, in accordance with some embodiments.

FIGS. 7D and 7E are corresponding layout diagrams, in accordance with some embodiments. FIGS. 7F and 7G are corresponding circuit diagrams, in accordance with some embodiments.

DETAILED DESCRIPTION

Figure 1:
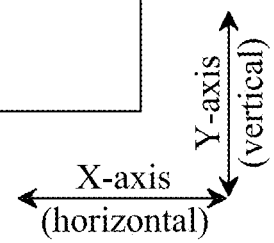
FIG. 1 is a block diagram of a semiconductor device 100 in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, a layout diagram is generated which is dual-architecture-compatible in a sense that selectively pruning patterns from the layout diagram yields either a first single-architecture-compatible layout diagram or a second single-architecture-compatible layout diagram, and wherein: the first single-architecture-compatible layout diagram has, i.e., is compatible with, a first type of architecture; and the second single-architecture-compatible layout diagram has, i.e., is compatible with, a second type of architecture. In some embodiments, the first type of architecture is a non-buried power rail (non-BPR) type of architecture, and the second type of architecture is a buried power rail (BPR) type of architecture. In some embodiments, selectively pruning the set of patterns included in the dual-architecture-compatible includes selectively disconnecting patterns, i.e., selectively removing patterns, from the dual-architecture-compatible layout diagram.

In some embodiments, a dual-architecture-compatible layout diagram which represents a given circuit design has a benefit of facilitating the porting (adapting) of the given circuit design to multiple types of architectures. More particularly, the porting (adapting) is facilitated because porting (adapting) the dual-architecture-compatible layout diagram does not require new patterns (shapes) to be added to the dual-architecture-compatible layout diagram, nor existing patterns (shapes) of the dual-architecture-compatible layout diagram to be extended or increase, or the like. Rather, the porting (adapting) of the dual-architecture-compatible layout diagram is a subtractive procedure that pares (selective removes) patterns from the dual-architecture-compatible.

In some embodiments, a method (of manufacturing a semiconductor device based on a dual-architecture-compatible design) includes forming transistor components in a transistor (TR) layer, and performing one of (A) fabricating additional components according to a buried power rail (BPR) type of architecture that includes layers below the transistor layer (sub-TR layers) and layers over the transistor layer (supra-TR layers) or (B) fabricating additional components according to a non-buried power rail (non-BPR) type of architecture that includes supra-TR layers; and wherein: the dual-architecture-compatible design is substantially equally suitable either to adaptation into the BPR type of architecture or adaptation into the non-BPR type of architecture; the (A) fabricating additional components according to a BPR type of architecture includes, in corresponding sub-TR layers, forming various non-dummy structures (non-dummy sub-TR structures), in corresponding supra-TR layers, forming various dummy structures (dummy supra-TR structures) which are corresponding artifacts resulting from the dual-architecture-compatible design being suitable to adaptation into the non-BPR type of architecture; and the (B) fabricating additional components according to a non-BPR type of architecture includes, in corresponding supra-TR layers, forming various non-dummy structures (non-dummy supra-TR structures) and forming various dummy structures (dummy supra-TR structures) which are corresponding artifacts resulting from the dual-architecture-compatible design being suitable to adaptation into the BPR type of architecture.

FIG. 1 is a block diagram of a semiconductor device 100 in accordance with some embodiments.

In FIG. 1, semiconductor device 100 includes, among other things, a region 104 and a region 106. Regions 104 and 106 are based on a corresponding dual-architecture-compatible layout diagram.

Region 104 has a non-buried power rail (non-BPR) type of architecture. Relative to a transistor (TR) layer, and in corresponding layers over the transistor layer (supra-TR layers), region 104 has: various non-dummy structures (non-dummy supra-TR structures) which are coupled to the transistor components and which are included because region 104 has the non-BPR type of architecture; and various dummy structures (dummy supra-TR structures) which are corresponding artifacts resulting from the corresponding dual-architecture-compatible design being suitable to adaptation into a buried power rail (BPR) type of architecture, the inclusion of the artifacts being expedient for fabrication of region 104. In other words, the artifacts are included for consistency with region 104 otherwise being compatible with a buried power rail (BPR) type of architecture.

In some embodiments, region 104 further includes various dummy structures (dummy sub-TR structures) which are corresponding artifacts resulting from the dual-architecture-compatible design being suitable to adaptation into the BPR type of architecture, the inclusion of the artifacts being expedient for the fabrication of region 104. In other words, the artifacts are included for consistency with region 104 otherwise being compatible with the BPR type of architecture.

Region 106 has a buried power rail (BPR) type of architecture. Relative to a transistor (TR) layer, region 106 has: in corresponding ones of the supra-TR layers, various dummy structures (dummy supra-TR structures) which are corresponding artifacts resulting from the dual-architecture-compatible design being suitable to adaptation into the non-BPR type of architecture, the inclusion of the artifacts being expedient for fabrication of region 106; and in corresponding ones of the sub-TR layers, various non-dummy structures (non-dummy sub-TR structures) coupled to the transistor components and which are included because region 106 has the BPR type of architecture. The artifacts, in other words, are included for consistency with region 106 otherwise being compatible with the non-BPR type of architecture.

In some embodiments, region 104 is not present in semiconductor device 100. In some embodiments, region 106 is not present in semiconductor device 100.

FIG. 2A is a cross-section of a dual-architecture-compatible layout diagram 208A that represents a semiconductor device, in accordance with some embodiments. FIGS. 2B and 2C are cross sections of corresponding single-architecture-compatible layout diagram 208B and 208C that represent corresponding semiconductor devices, in accordance with some embodiments. FIGS. 2D and 2E are corresponding top views of single-architecture-compatible layout diagrams 208D and 208E representing corresponding semiconductor devices, in accordance with some embodiments. FIGS. 2F and 2G are corresponding circuit diagrams 208F and 208G, in accordance with some embodiments.

More particularly, FIGS. 2B, 2D and 2F correspond with each other, and FIG. 2B is derived from FIG. 2A. FIGS. 2C, 2E and 2G correspond with each other, and FIG. 2D is derived from FIG. 2A. In some embodiments, layout diagrams 208A-208E of corresponding FIGS. 2A-2E are stored on a non-transitory computer-readable medium (see FIG. 10).

Layout diagrams 208A includes a set of patterns that represent components of a semiconductor device. Furthermore, layout diagram 208A is dual-architecture-compatible in a sense that selectively pruning patterns from layout diagram 208A yields either a first single-architecture-compatible layout diagram which has a first type of architecture or a second single-architecture-compatible layout diagram which has a second type of architecture. More particularly, pruning a first subset of patterns from layout diagram 208A yields layout diagram 208B of FIG. 2B as the first layout diagram, the latter representing a semiconductor device which has the non-buried power rail (again, non-BPR) type of architecture. Pruning a second subset of patterns from layout diagram 208A yields layout diagram 208C as the second layout diagram, the latter representing a semiconductor device which has the buried power rail (again, BPR) type of architecture.

In some embodiments, selectively pruning the set of patterns included in layout diagram 208A as noted above includes selectively disconnecting patterns of layout diagram 208A, i.e., selectively removing patterns from layout diagram 208A. In some embodiments, selectively pruning the set of patterns included in layout diagram 208A as noted above includes selectively paring layout diagram 208A, i.e., selectively removing patterns from layout diagram 208A. In some embodiments, selectively pruning the set of patterns included in layout diagram 208A as noted above includes selectively trimming layout diagram 208A, i.e., selectively removing patterns from layout diagram 208A.

Dual-architecture-compatible layout diagram 208A is thus provided to facilitate design porting between single-architecture-compatible non-BPR-architecture layout diagrams and single-architecture-compatible BPR-architecture layout diagrams. In some embodiments, dual-architecture-compatible layout diagram 208A is pruned so that the final semiconductor device represented in a corresponding final layout diagram either has a non-BPR type of architecture which lacks a BPR or a BPR type of architecture which lacks a non-BPR.

Discussion of FIGS. 2A-2C will refer to patterns in layout diagrams 208A-208C as if they are components of corresponding semiconductor devices which are based on corresponding layout diagrams 208A-208C.

In some embodiments, a dummy structure, in general, is a structure which is not a primary contributor to the functional purpose of a semiconductor device. In some embodiments, a dummy structure is not a primary contributor to a logical function, memory function, amplifying function, buffering function, power-shaping function, or the like, of a semiconductor device.

In some embodiments, a first type of dummy structure is included in a semiconductor device as a secondary contributor to the functional purpose of a semiconductor device, e.g., by being interposed between non-dummy structures, i.e., primary contributors to the functional purpose of a semiconductor device, and thereby reducing cross-talk (interference) between the non-dummy structures, or the like.

In some embodiments, a second type of dummy structure is included in a semiconductor device as a tertiary contributor to the functional purpose of a semiconductor device, e.g., because the inclusion of the second type of dummy structure improves the results of a planarization process, e.g., chemical-mechanical polishing (CMP), performed during fabrication and the improved results of planarization facilitate improved performance by non-dummy structures, i.e., primary contributors to the functional purpose of the semiconductor device.

In some embodiments, in a context of a semiconductor device which is based on a dual-architecture-compatible design and which is configured with a first one of the two architectures of the dual-architecture design, a third type of dummy structure is included in the semiconductor device. The third type of dummy structure is included in the semiconductor device because the third type of dummy structure is an artifact resulting from the dual-architecture-compatible design being suitable not only to adaption into the first architecture but also being suitable to adaptation into the second architecture.

In some embodiments, the third type of dummy structure coincidentally also is a secondary or tertiary contributor to the functional purpose of a semiconductor device. However, the primary reason that the third type of dummy structure is included in a semiconductor device is because inclusion of the third type of dummy structure is expedient in terms of the fabrication of the semiconductor device. That is, in terms of process features/aspects/steps associated with fabricating the third type of dummy structure, it is expedient to form the third type of dummy structure rather than undertake process features/aspects/steps associated with not forming the third type of dummy structure. In some embodiments, the third type of dummy structure is included in a semiconductor device because the process features/aspects/steps associated with fabricating the third type of dummy structure are advantageous in comparison to the process features/aspects/steps otherwise associated with not fabricating the third type of dummy structure.

In FIG. 2A, dual-architecture-compatible layout diagram 208A includes a transistor (TR) layer which is shown as extending along a first direction, and having a thickness relative to the a second direction which is perpendicular to the first direction. In FIG. 2A, the first direction is along the X-axis and the second direction is along the Z-axis. In some embodiments, the first and second directions are directions other than being correspondingly along the X-axis and the Z-axis.

In FIG. 2A, relative to the Z-axis, and above the TR layer, layout diagram 208A further includes supra-TR layers, the supra-TR layers including: a contact-to-transistor-component layer (MD/MG layer); a via-between-contact-and-metallization layer (VD/VG layer); a first layer of metallization (M0 layer); a first layer of interconnection (VIA0 layer); a second layer of metallization (M1 layer); a second layer of interconnection (VIA1 layer); a third layer of metallization (M2 layer); a third layer of interconnection (VIA2 layer); a fourth layer of metallization (M3 layer); a fourth layer of interconnection (VIA3 layer); a fifth layer of metallization (M4 layer); a fifth layer of interconnection (VIA4 layer); a sixth layer of metallization (M5 layer); a sixth layer of interconnection (VIA5 layer); a seventh layer of metallization (M6 layer); a seventh layer of interconnection (VIA6 layer); an eighth layer of metallization (M7 layer); an eighth layer of interconnection (VIA7 layer); a ninth layer of metallization (M8 layer); a ninth layer of interconnection (VIA8 layer); a tenth layer of metallization (M9 layer); a tenth layer of interconnection (VIA9 layer); an eleventh layer of metallization (M10 layer); an eleventh layer of interconnection (VIA10 layer); a twelfth layer of metallization (M11 layer); a twelfth layer of interconnection (VIA11 layer); a thirteenth layer of metallization (M12 layer); a thirteenth layer of interconnection (VIA12 layer); a fourteenth layer of metallization (M13 layer); a fourteenth layer of interconnection (VIA13 layer); a fifteenth layer of metallization (M14 layer); a fifteenth layer of interconnection (VIA14 layer); a sixteenth layer of metallization (M15 layer); a sixteenth layer of interconnection (VIA15 layer); a redistribution layer (RV layer); and a pad layer (AP layer).

In some embodiments, layout diagram 208A has a greater number of supra-TR metallization layers and a correspondingly greater number of supra-TR interconnection layers. In some embodiments, layout diagram 208A has fewer supra-TR metallization layers and a correspondingly fewer supra-TR interconnection layers.

Relative to the Z-axis, and below the TR layer, layout diagram 208A further includes sub-TR layers, the sub-TR layers including: a buried contact-to-transistor-component layer (BVD/BVG); a first buried layer of metallization (BM0 layer); a first buried layer of interconnection (BVIA0 layer); a second buried layer of metallization (BM1 layer); a second buried layer of interconnection (BVIA1 layer); a third buried layer of metallization (BM2 layer); a third buried layer of interconnection (BVIA2 layer); a fourth buried layer of metallization (BM3 layer); a fourth buried layer of interconnection (BVIA3 layer); a fifth buried layer of metallization (BM4 layer); a fifth buried layer of interconnection (BVIA4 layer); a sixth buried layer of metallization (BM5 layer); a buried redistribution layer (BRV layer); and a buried pad layer (BAP layer).

Regarding FIG. 2A, in some embodiments, the TR layer is a layer of semiconductor material which includes regions that have been correspondingly doped to serve various corresponding purposes. More particularly, in FIG. 2A, the TR layer includes: a first type of doped region which is labelled "G" and is configured to serve as a gate terminal (G terminal) for a corresponding transistor structure; a second type of doped region which is labelled "D" and is configured to serve as a drain terminal (D terminal) for a corresponding transistor structure; a third type of doped region which is labelled "S" and is configured to serve as a source terminal (S terminal) for a corresponding transistor structure; a fourth type of doped region which is labelled "B" and is configured to serve as a body-bias terminal (B terminal) for a corresponding transistor structure; and a fifth type of doped region which is labelled TTLV and is configured to serve as a conductive portion in an electrical coupling path between a given MD structure (discussed below) in the MD/MG layer and a corresponding BVD structure (discussed below) in the BVD/BVG layer, or in an electrical coupling path between a given MG structure (discussed below) in the MD/MG layer and a corresponding BVG structure (discussed below) in the BVD/BVG layer. The fifth type of doped region will be referred to as a through-transistor-layer via (TTLV). In some embodiments, in place of the fifth type of doped region, a through-silicon via (TSV) structure is used as a conductive portion in an electrical coupling path between a given MD structure (again, discussed below) in the MD/MG layer and a corresponding BVD structure (again, discussed below) in the BVD/BVG layer, or in an electrical coupling path between a given MG structure (again, discussed below) in the MD/MG layer and a corresponding BVG structure (again, discussed below) in the BVD/BVG layer. For simplicity of illustration, FIG. 2A shows TSV structures rather than the fourth type of doped region.

In some circumstances, an insulating region (IR) is provided between doped regions. An instance of the insulating region between columns C4 and C5 is called out the label IR in FIG. 2A. In some embodiments, one or more instances of the insulating region include dielectric material. In some embodiments, an instance of the insulating region is formed by converting the semiconductor material of the TR layer into a dielectric material. In some embodiments in which the semiconductor material of the TR layer is silicon, a given instance of the insulating region includes silicon dioxide which has been grown from the silicon at the location of the insulating region in the TR layer.

In FIG. 2A, regarding supra-TR layers, the contact-to-transistor-component layer (MD/MG layer) includes: one or more contact structures of a first type, each of which is configured to electrically couple correspondingly to a drain terminal (D), a source terminal (S), a body-bias terminal (B) of a corresponding transistor structure in the TR layer, or a corresponding TSV structure in the TR layer, the first type being referred to herein as an MD contact structure; and one or more contact structures of a second type, each of which is configured to electrically couple to a gate terminal (G) of a corresponding transistor structure in the TR layer, the second type being referred to herein as an MG contact structure. In some embodiments, the MD contact structure is not used to electrically couple to a corresponding TSV structure in the TR layer, but instead the MD/MG layer further includes one or more contact structures of a third type (not shown) which is configured to electrically couple to a corresponding TSV structure in the TR layer.

The via-between-contact-and-metallization layer (VD/VG layer) includes: one or more via-between-contact-and-metallization structures of a first type, each of which is configured to electrically couple to a corresponding MD contact structure, the first type being referred herein as an VD structure; and one or more via-between-contact-and-metallization structures of a second type, each of which is configured to electrically couple to a corresponding MG contact structure, the second type being referred to herein as a VG contact structure. In some embodiments, in which the VD/VG layer includes one or more contact structures of the third type (not shown) that is configured to electrically couple to a corresponding TSV structure in the TR layer, the via-between-contact-and-metallization layer (VD/VG layer) further includes one or more via-between-contact-and-metallization structures of a third type (not shown). The third type of via-between-contact-and-metallization structure is configured to electrically couple to a corresponding TSV structure in the TR layer.

In FIG. 2A, each of metallization layers M0-M15 includes one or more conductive segments. Each interconnection layer VIA0-VIA14 includes one or more via structures. The redistribution layer includes one or more redistribution contact structures (RV contact structures). The pad layer AP includes one or more pads.

In FIG. 2A, regarding sub-TR layers, the buried contact-to-transistor-component layer (BVD/BVG layer); includes: one or more contact structures of a first type, each of which is configured to electrically couple correspondingly to a drain terminal (D), a source terminal (S), a body-bias terminal (B) of a corresponding transistor structure in the TR layer, or a corresponding TSV structure in the TR layer, the first type being referred to herein as an BVD contact structure; and one or more contact structures of a second type, each of which is configured to electrically couple to a gate terminal (G) of a corresponding transistor structure in the TR layer, the second type being referred to herein as an BVG contact structure. In some embodiments, the BVD contact structure is not used to electrically couple to a corresponding TSV structure in the TR layer, but instead the BVD/BVG layer further includes one or more contact structures of a third type (not shown) which is configured to electrically couple to a corresponding TSV structure in the TR layer.

In FIG. 2A, each of buried metallization layers BM0-BM5 includes one or more buried conductive segments. Each buried interconnection layer BVIA0-BVIA4 includes one or more buried via structures. The buried redistribution layer BRV includes one or more buried redistribution contact structures (BRV contact structures). The buried pad layer AP includes one or more buried pads.

In FIG. 2A, example pitches are listed for each of metallization layers M0-M15, pad layer AP, each of buried metallization layers BM0-BM5, and buried pad layer BAP, wherein each pitch is a multiple of a unit measure of distance, d. For example, the pitch of layer M0 in FIG. 2A is 22 d. In some embodiments, d is one nanometer. In some embodiments, d is a value other than one nanometer. In some embodiments, different pitches are used correspondingly for one or more of metallization layers M0-M15.

For purposes of discussion, layout diagram 208A is organized into columns C1, C2, C3, C4 and C5. For example, column C2 includes an electrically conductive path which electrically couples the pad in pad layer AP to the buried pad in layer BAP. The electrically conductive path in column C2 includes: the pad in pad layer AP to the buried pad in layer BAP; an RV contact structure in the RV layer; a supra-TR single-stack via (SS_via) 210A; a VD structure in the VD/VG layer; an MD contact structure in the MD/MG layer; a D terminal in the TR layer; a BVD structure in the BVD/BVG layer; a sub-TR SS_via; a BRV contact structure in the BRV layer; and the buried pad in buried pad layer BAP.

In column C2 of FIG. 2A, supra-TR SS_via 210A includes corresponding conductive segments in metallization layers M0-M15 and corresponding via structures in each of interconnection layers VIA0-VIA14. The sub-TR SS_via in column C2 includes corresponding buried conductive segments in buried metallization layers BM0-BM5 and corresponding buried via structures in each of interconnection layers VIA0-VIA14.

Relative to the X-axis, regarding column C2, none of the pad in the pad layer AP, the conductive structures in metallization layers M0-M15, the buried conductive segments in buried metallization layers BM0-BM5, nor the buried pad in the buried pad layer BAP extends correspondingly into column C1 nor into column C3.

layout diagram 208A includes additional SS_vias in each of columns C1, C3, C4 and C5. However, for purposes of simplifying the drawings, the additional SS_vias are not called out in FIG. 2A with corresponding reference numbers.

Column C1 includes a first electrically conductive path which electrically couples a pad in pad layer AP to a B terminal in the TR layer. The first electrically conductive path of column C1 includes: the pad in pad layer AP; an RV contact structure in the RV layer; a supra-TR SS_via (spanning metallization layers M0-M15 and corresponding interconnection layers VIA0-VIA14); a VD structure in the VD/VG layer; an MD contact structure in the MD/MG layer; and the B terminal in the TR layer.

Column C1 further includes a second electrically conductive path which electrically couples a conductive segment in buried metallization layer BM0 and a buried pad in buried pad layer BAP. The second electrically conductive path of column C1 includes: a sub-TR SS_via (spanning buried metallization layers BM0-BM5 and corresponding buried interconnection layers BVIA0-BVIA4); a BRV contact structure in the BRV layer; and the buried pad in buried pad layer BAP. Regarding column C1, the buried conductive segment in buried metallization layer BM0 of column C1 is electrically coupled to the buried pad in buried pad layer BAP. However, because column C1 lacks a BVD structure in the BVD/BVG layer, the buried conductive segment in buried metallization layer BM0 is not electrically coupled to the B terminal. Accordingly, in column C1, the B terminal is not electrically coupled to the buried pad in buried pad layer BAP.

Relative to the X-axis, regarding column C1, none of the pad in the pad layer AP, the conductive structures in metallization layers M0-M15, the buried conductive segments in buried metallization layers BM0-BM5, nor the buried pad in the buried pad layer BAP extends correspondingly into column C2.

In FIG. 2A, column C3 includes a first electrically conductive path which electrically couples a pad in pad layer AP to a G terminal in the TR layer. The first electrically conductive path of column C3 includes: the pad in pad layer AP; an RV contact structure in the RV layer; a supra-TR SS_via (spanning metallization layers M0-M15 and corresponding interconnection layers VIA0-VIA14); a VG structure in the VD/VG layer; an MG contact structure in the MD/MG layer; and the G terminal in the TR layer.

Regarding the sub-TR layers, column C3 includes a routing arrangement, the routing arrangement including corresponding conductive segments in buried metallization layers BM0-BM5 and a buried pad in buried pad layer BAP. The conductive segments in buried metallization layers BM0-BM5 are available for routing signals to other structures (not shown in FIG. 2A). It is noted that the routing arrangement of column C3 lacks a BVD structure in the BVD/BVG layer, corresponding via structures in the buried interconnection layers BVIA0-BVIA4, and a BRV contact structure in the BRV layer. Accordingly, the routing arrangement in column C3 does not represent a second electrically conductive path in column C3 which might otherwise have electrically coupled the terminal C in the TR layer with the buried pad in the buried pad layer BAP.

Relative to the X-axis, regarding column C3, none of the pad in the pad layer AP, the conductive structures in metallization layers M0-M7, the buried conductive segments in buried metallization layers BM0-BM5, nor the buried pad in buried pad layer BAP extends correspondingly into column C2 nor into column C4. Relative to the X-axis, the conductive structures in metallization layers M8 and M9 extend correspondingly into column C4 but do not extend in column C2.

In layout diagram 208A, column C4 includes: a first electrically conductive path which electrically couples a conductive segment in layer M7 and a buried pad in the buried pad layer BAP. The first electrically conductive path in column C4 includes: a first supra-TR SS_via (spanning metallization layers M0-M7 and corresponding interconnection layers VIA0-VIA6); a VD structure in the VD/VG layer; an MD contact structure in the MD/MG layer; an S terminal in the TR layer; a BVD structure in the BVD/BVG layer; a sub-TR SS_via; a BRV contact structure in the BRV layer; and the buried pad in buried pad layer BAP. Column C4 further includes a second supra-TR SS_via (spanning metallization layers M8-M9 and corresponding interconnection layer VIA8).

Column C4 further includes conductive segments in metallization layers M8 and M9, and a corresponding via structure in interconnection layer VIA8 which are included in a via pillar 212A, discussed below. Relative to the X-axis, the conductive structures in metallization layers M8 and M9 extend correspondingly into column C5 but do not extend in column C3.

Column C4 further includes a routing arrangement, the routing arrangement including corresponding conductive segments in metallization layers M10-M15 and a pad in pad layer AP. The conductive segments in metallization layers M10-M15 are available for routing signals to other structures (not shown in FIG. 2A). It is noted that the routing arrangement of column C4 lacks corresponding via structures in the interconnection layers VIA9-VIA14 and an RV contact structure in the RV layer. Accordingly, the routing arrangement in column C4 does not represent a second electrically conductive path in column C4.

Relative to the X-axis, regarding column C4; none of the pad in the pad layer AP, the conductive structures in metallization layers M0-M7, the buried conductive segments in buried metallization layers BM0-BM5, nor the buried pad in the buried pad layer BAP extends correspondingly into column C3 nor into column C5; and the conductive structures in metallization layers M8 and M9 extend correspondingly into each of columns C3 and C4; and the conductive structures in metallization layers M10-M15 extend correspondingly into column C5 but do not extend in column C3.

In layout diagram 208A column C5 includes: a first electrically conductive path which electrically couples a conductive segment in layer M9 and a buried pad in the buried pad layer BAP. The first electrically conductive path in column C5 includes: a supra-TR SS_via (spanning metallization layers M0-M9 and corresponding interconnection layers VIA0-VIA8); a VD structure in the VD/VG layer; an MD contact structure in the MD/MG layer; a TSV structure in the TR layer; a BVD structure in the BVD/BVG layer; a sub-TR SS_via; a BRV contact structure in the BRV layer; and the buried pad in buried pad layer BAP.

In layout diagram 208A, the second supra-TR SS_via of column C4 (which spans metallization layers M8-M9 and corresponding interconnection layer VIA8) and the supra-TR SS_via of column C5 (which spans metallization layers M0-M9 and corresponding interconnection layers VIA0-VIA8) together represent a supra-TR via pillar 212A.

In some embodiments, a via pillar such as supra-TR via pillar 212A refers to an arrangement of multiple SS_vias which are connected in parallel. In some embodiments, relative to length as measured along the Y-axis, the 'legs' of a via pillar are symmetric. In some embodiments, relative to length as measured along the Y-axis, the 'legs' of a via pillar are asymmetric. In some embodiments, in a situation in which a via pillar replaces a sole SS_via within a given electrically conductive path, the use of a via pillar reduces electrical resistance of the given electrically conductive path as compared to use of the sole SS_via, which provides performance advantages, e.g., with respect to timing and signal propagation delays. However, there is a trade-off that exists with respect to use of via pillars, e.g., because a via pillar requires additional space within a geometry of a semiconductor device as compared to the use of a sole SS_via, which can make routing more difficult and increase an overall size of the semiconductor device. Use of a via pillar reflects a decision that the advantages outweigh the trade-off.

In column C5, the conductive structures in metallization layers M8 and M9 extend correspondingly into column C4, and further extend beyond column C4 into column C3. As such, via pillar 212A is part of a larger via pillar which includes not only via pillar 212A but also the supra-TR SS_via of column C3 (which spans metallization layers M0-M15 and corresponding interconnection layers VIA0-VIA14).

Column C5 further includes a routing arrangement, the routing arrangement including corresponding conductive segments in metallization layers M10-M15 and a pad in pad layer AP. The conductive segments in metallization layers M10-M15 are available for routing signals to other structures (not shown in FIG. 2A). It is noted that the routing arrangement of column C5 lacks corresponding via structures in the interconnection layers VIA9-VIA14 and an RV contact structure in the RV layer. Accordingly, the routing arrangement in column C5 does not represent a second electrically conductive path in column C5.

Relative to the X-axis, regarding column C5; none of the conductive structures in metallization layers M0-M7, the buried conductive segments in buried metallization layers BM0-BM5, nor the buried pad in the buried pad layer BAP extends into column C4; and the conductive structures in metallization layers M8 and M9 extend correspondingly into column C4 (as noted above); and the conductive structures in metallization layers M10-M15 extend into column C5.

Again, from layout diagram 208A of FIG. 2A is dual-architecture-compatible and selectively prunable to yield either single-architecture-compatible layout diagram 208B of FIG. 2B or single-architecture-compatible layout diagram 208C of FIG. 2C. Single-architecture-compatible layout diagram 208B has a non-buried power rail (non-BPR) type of architecture. Single-architecture-compatible layout diagram 208C has a buried power rail (BPR) type of architecture. Layout diagram 208A is configured for consistency with the non-BPR type of architecture and the BPR type of architecture.

FIG. 2B is a cross section of single-architecture-compatible layout diagram 208B, in accordance with some embodiments.

Single-architecture-compatible layout diagram 208B represents a decoupling capacitor circuit which has a non-buried power rail (non-BPR) type of architecture. From FIG. 2A to FIG. 2B, structures (patterns) are pared from layout diagram 208A for consistency with the non-BPR type of architecture.

In FIG. 2B, as part of configuring layout diagram 208B with a non-BPR type of architecture, all of the structures in the various sub-TR layers have been removed from columns C1-C5, leaving the TR layer and supra-TR structures. In some embodiments, fewer than all of the structures in the noted sub-TR layers are removed, i.e., some but not all of the structures in the noted sub-TR layers are retained. In such embodiments in which some but not all of the structures in the noted sub-TR layers are retained; however, at least the BVD structures in columns C2, C4 and C5 are removed.

In FIG. 2B, also as part of configuring layout diagram 208B with the non-BPR type of architecture, portions in each of metallization layers M8 and M9, which are located between columns C4 and C5 in FIG. 2A and which are called out by reference number 214A in FIG. 2A, have been removed. Removing portions 214A from layout diagram 208A results in the following in FIG. 2B: a via pillar 212B in columns C3-C4; and an SS_via 210B in column C5.

SS_via 210B in column C5 is a supra-TR dummy structure and is regarded as an artifact of layout diagram 208B having been based on dual-architecture-compatible layout diagram 208A. As such, SS_via 210B is included for consistency with layout diagram 208B otherwise being compatible with the BPR type of architecture. In some embodiments, dummy SS_via 210B is referred to as a dummy structure because SS_via 210B is left floating. In some embodiments, dummy SS_via 210B is referred to as a supra-TR dummy structure because SS_via 210B does not form a part of an electrically conductive path to or from an active component in layout diagram 208B. In contrast to supra-TR dummy SS_via 210B, the other supra-TR structures in layout diagram 208B are referred to as supra-TR non-dummy structures. Though such dummy structures are artifacts, i.e., instances of the third type of dummy structure, nevertheless, in some embodiments, such dummy structures have utility in a sense that such dummy structures serve as indications that layout diagram 208B was based on dual-architecture-compatible layout diagram 208A.

In FIG. 2B, as viewed from the Z-axis, a footprint of a given structure is an area relative to the X-axis and the Y-axis (the latter not being shown in FIG. 2A) which is occupied by the given structure. In FIG. 2B, a footprint of supra-TR dummy SS_via 210B is substantially contained within a collective footprint of the components of layout diagram 208B which are in the TR layer, namely the B terminal in column C1, the D terminal in column C2, the G terminal in column C3, the S-terminal in column C4 and the TSV in column C5. Relative to the X-axis, supra-TR dummy SS_via 210B is located asymmetrically with respect to the components of layout diagram 208B which are in the TR layer, namely the B terminal in column C1, the D terminal in column C2, the G terminal in column C3, the S-terminal in column C4 and the TSV in column C5.

FIG. 2B further includes a pictograph 220B. Pictograph 220B is a simplified representation of layout diagram 208B which reflects that layout diagram 208B: represents a device with a non-BPR type of architecture; and includes supra-TR non-dummy structures and supra-TR dummy structures, but which lacks sub-TR non-dummy structures and sub-TR dummy structures.

FIG. 2C is a cross section of layout diagram 208C, in accordance with some embodiments.

Layout diagram 208C is a decoupling capacitor circuit which has a buried power rail (BPR) type of architecture. From FIG. 2A to FIG. 2C, structures (patterns) are pared from layout diagram 208A for consistency with the BPR type of architecture. Accordingly, layout diagram 208C retains sub-TR structures. Among the sub-TR non-dummy structures, layout diagram includes sub-TR SS_via 212G.

In FIG. 2C, as part of configuring layout diagram 208C with the BPR type of architecture, various structures in some of the supra-TR layers are removed. More particularly, in FIG. 2C, all of the structures in metallization layers M10-M15, corresponding interconnection layers VIA9-VIA14, in the RV layer and in the AP layer from columns C1-C5 are removed. In some embodiments, fewer than all of the structures in the noted supra-TR layers are removed, i.e., some but not all of the structures in the noted supra-TR layers are retained. In such embodiments in which some but not all of the structures in the noted supra-TR layers are retained, however, at least the via structures at the intersection of interconnection layer VIA9 and each of columns C1, C2 and C3 is removed.

Regarding column C3, removing all of the structures in metallization layers M10-M15, corresponding interconnection layers VIA9-VIA14, the RV layer and the AP layer results in a via pillar 212C having portions in columns C3, C4 and C5.

FIG. 2C further includes a pictograph 220C. Pictograph 220C is a simplified representation of layout diagram 208C which reflects that layout diagram 208C: represents a device with a BPR type of architecture; and includes supra-TR non-dummy structures and sub-TR non-dummy structures, but which lacks supra-TR dummy structures and sub-TR dummy structures.

FIG. 2D, again, is a top view of layout diagram 208D which corresponds to the cross-section of layout diagram 208B of FIG. 2B. Layout diagram 208D does not include patterns in layers below layer M9. Among other patterns, layout diagram 208D includes an "M9 (VSS)" pattern which represents a conductive segment in metallization layer M9 of FIG. 2D that provides VSS. In layout diagram 208E, some of the white space below the M9 (VSS) pattern is called out with reference number 218D. In some embodiments, in the context of a layout diagram, and further in the context of a given layer/level of the layout diagram, the term "white space" refers to an area in which a pattern is not present, i.e., an area which lacks a pattern. Though layout diagram 208D does not include patterns in layers below layer M9, nevertheless an approximate underlying location of dummy structure 210B (if otherwise included) is shown in FIG. 2D.

Again, FIG. 2E is a top view of layout diagram 208E which corresponds to the cross-section of layout diagram 208C of FIG. 2C. Layout diagram 208E does not include patterns below layer M9. Relative to FIG. 2D, among other things, one or more patterns 218E representing a portion of via pillar 212C of FIG. 2C have been added in an area corresponding to white space 218D in layout diagram 208D of FIG. 2D. Though layout diagram 208E does not include patterns below layer M9, nevertheless approximate underlying locations of sub-TR SS_vias 210C(2), 210C(4) and 210C(5), and a VD-decontented version 210C(3)' of a sub-TR SS_via, (if otherwise included) are shown in FIG. 2E.

Regarding FIG. 2F, circuit diagram 208F is a capacitive coupling circuit which includes: a capacitor-configured transistor P1 which is PMOS and which is coupled between a first reference voltage and a second reference voltage. Correspondences between portions of transistor P1 and the columns of FIG. 2B are called out in circuit diagram 208F. In some embodiments, the first reference voltage is VDD and the second reference voltage is VSS. In some embodiments, the first and second reference voltages are something other than corresponding voltages VDD and VSS.

In FIG. 2F, a gate terminal of transistor P1 is connected to the first node, and each of a drain terminal, a source terminal and a body-bias terminal of transistor P1 is connected to VDD. FIG. 2F relates to FIG. 2B in ways which include the following: in FIG. 2B, the pad in pad layer AP for each of columns C1 and C2 in FIG. 2B is electrically coupled to VDD; the pad in pad layer AP for column C3 in FIG. 2B is coupled to the first node; and, regarding column C4, the conductive segment in metallization layer M7 of FIG. 2B is electrically coupled to VDD by a routing arrangement not shown in FIG. 2B.

FIG. 2G, is similar to FIG. 2F, and so circuit diagram 208G is a capacitive coupling circuit which includes capacitor-configured transistor PI of FIG. 2F. Correspondences between portions of transistor P1 and the columns of FIG. 2C are called out in circuit diagram 208G. However, because circuit diagram 208G corresponds to layout diagram 208C of FIG. 2C, the latter having a BPR-type architecture, the gate terminal of transistor P1 in circuit diagram 208G is connected to a first node in FIG. 2G; and a sub-TR SS_via 212G is coupled between the first node and VSS.

Figures 3A, 3B, 3C:
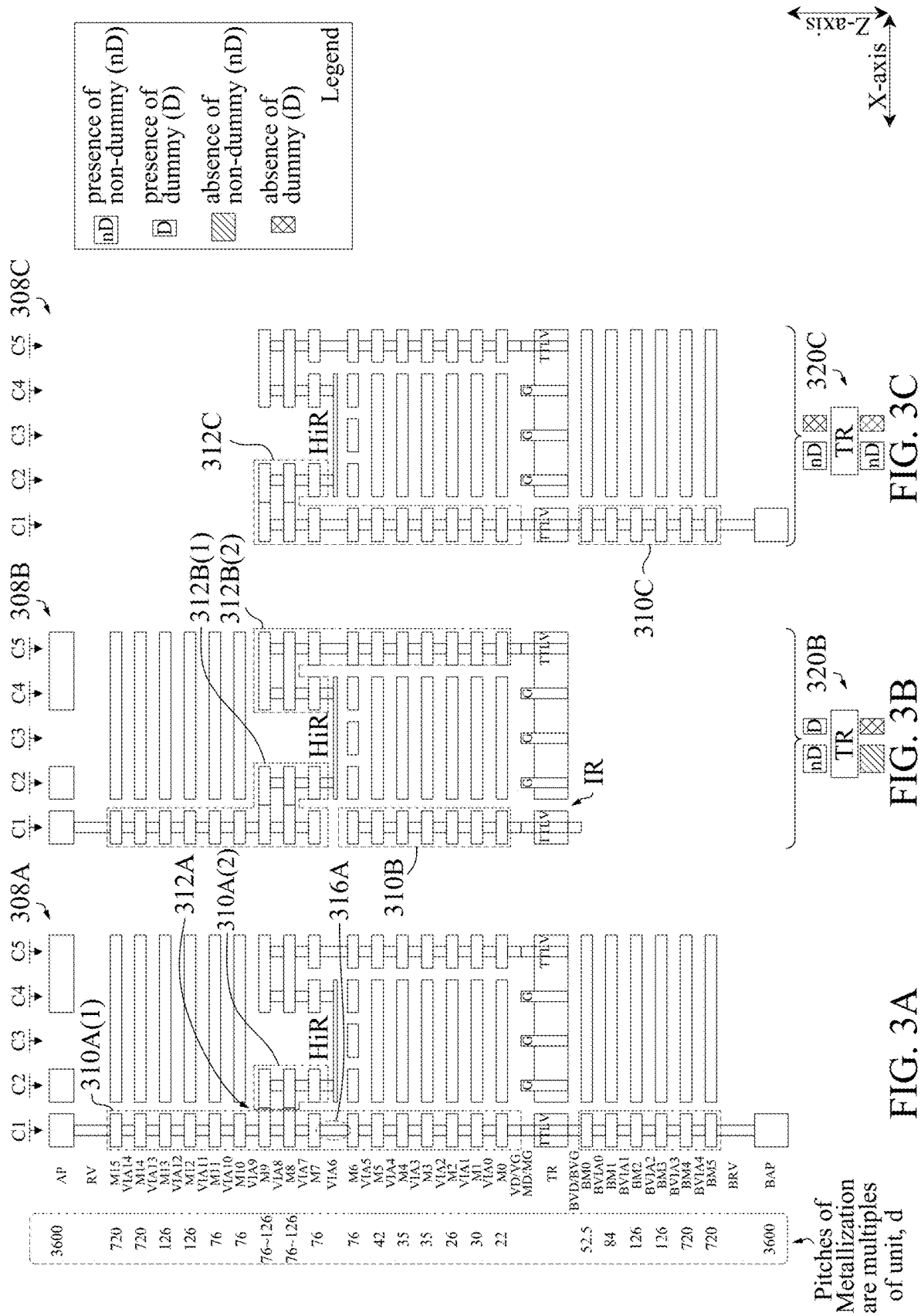
FIGS. 3A, 3B and 3C are corresponding cross sections.

FIG. 3A is a cross-section of a dual-architecture-compatible layout diagram 308A that represents a semiconductor device, in accordance with some embodiments. FIGS. 3B and 3C are cross sections of corresponding single-architecture-compatible layout diagrams 308B and 308C that represent corresponding semiconductor devices, in accordance with some embodiments. FIGS. 3D and 3E are corresponding top views of single-architecture-compatible layout diagrams 308D and 308E representing corresponding semiconductor devices, in accordance with some embodiments. FIGS. 3F and 3G are corresponding circuit diagrams 308F and 308G, in accordance with some embodiments.

More particularly, FIGS. 3B, 3D and 3F correspond with each other. FIGS. 3C, 3E and 3G correspond with each other. In some embodiments, layout diagrams 308A-308E of corresponding FIGS. 3A-3E are stored on a non-transitory computer-readable medium (see FIG. 10).

FIGS. 3A-3G follow a similar numbering scheme to that of FIGS. 2A-2G. Though corresponding, some components also differ. To help identify components which correspond but nevertheless have differences, the numbering convention uses 3-series numbers for FIGS. 3A-3E while FIGS. 2A-2G uses 2-series numbers. For example, item 312A in FIG. 3A is an instance of a via pillar and corresponding item 212A in FIG. 2A is an instance of a via pillar, and wherein: similarities are reflected in the common root_12A; and differences are reflected in the corresponding leading digit 3 in FIG. 3A and 2 in FIG. 2A. For brevity, the discussion will focus more on differences between FIGS. 3A-3E and FIGS. 2A-2G than on similarities.

The cross section of FIG. 3A is, again, a cross-section of layout diagram 308A. Layout diagram 308A is dual-architecture-compatible and selectively prunable to yield either single-architecture-compatible layout diagram 308B of FIG. 3B (which represents a high resistance (HiR) structure having a non-BPR type of architecture) or single-architecture-compatible layout diagram 308C of FIG. 3C (which represents a HiR structure having a BPR type of architecture).

For purposes of discussion, layout diagram 308A is organized into columns C1, C2, C3, C4 and C5. For example, column C1 includes an electrically conductive path which electrically couples the pad in pad layer AP to the buried pad in layer BAP. Among other things, the electrically conductive path in column C1 includes: supra-TR SS_via 310A(1) which spans metallization layers M0-M15 and corresponding interconnection layers VIA0-VIA14; and a sub-TR SS_via which spans buried metallization layers BM0-BM5 and corresponding buried interconnection layers BVIA0-BVIA4.

Among other things, column C2 includes a supra-TR SS_via 310A(2) which spans metallization layers M7-M9 and corresponding interconnection layers VIA7-VIA8.

In layout diagram 308A, the conductive segments in metallization layers M8-M9 extend from column C2 to column C1 with a result that supra-TR SS_via 310A(2) of column C2 and supra-TR SS_via 310A(1) of column C1 together represent a first supra-TR via pillar 312A. A second supra-TR via pillar is found in column C4 and a portion of column C3. Relative to the Y-axis as an axis of symmetry, the second supra-TR via pillar is a mirror symmetric counterpart.

In FIG. 3A, a highly resistive segment in interconnection layer VIA6 extends from column C2 to and through column C3, and onward into column C4. A first end of the highly resistive segment is in column C2 and is electrically coupled to first supra-TR via pillar 312A. A second end of the highly resistive segment is in column C2 and is electrically coupled to second supra-TR via pillar.

FIG. 3A further includes: a routing arrangement in metallization layers M10-M15 of columns C2-C5; a routing arrangement in metallization layers M0-M15 of columns C2-C4; and a routing arrangement in buried metallization layers BM0-BM5 of columns C2-C5.

Again, FIG. 3B is a cross section of layout diagram 308B which is a HiR structure that has a non-BPR type of architecture, in accordance with some embodiments.

Layout diagram 308B is a HiR structure which has a non-buried power rail (non-BPR) type of architecture. From FIG. 3A to FIG. 3B, structures (patterns) are pared from layout diagram 308A for consistency with the non-BPR type of architecture.

In FIG. 3B, as part of configuring layout diagram 308B with a non-BPR type of architecture, all of the structures in the various sub-TR layers have been removed from columns C1-C5, leaving the TR layer and supra-TR structures. In some embodiments, fewer than all of the structures in the noted sub-TR layers are removed, i.e., some but not all of the structures in the noted sub-TR layers are retained. In such embodiments in which some but not all of the structures in the noted sub-TR layers are retained, however, at least the BVD structure in column C1 is removed.

In FIG. 3B, also as part of configuring layout diagram 308B with the non-BPR type of architecture, a via structure 316A at the intersection of interconnection layer VIA6 and column C1 has been removed. Removing via structure 316A from layout diagram 308A results in the following in FIG. 3B: supra-TR first via pillar 312B in columns C1-C2 which spans metallization layers M7-M15 and corresponding interconnection layers VIA7-VIA14; and a first supra-TR SS_via 310B in column C1 which spans metallization layers M0-M6 and corresponding interconnection layers VIA0-VIA5.

The supra-TR first SS_via in column C1 is a supra-TR dummy structure and is regarded as an artifact of layout diagram 308B having been based on dual-architecture-compatible layout diagram 308A. As such, the first supra-TR SS_via in column C1 is included for consistency with layout diagram 308B otherwise being compatible with the BPR type of architecture. In contrast to the supra-TR first SS_via in column C1, the other supra-TR structures in layout diagram 308B are referred to as supra-TR non-dummy structures. Though such dummy structures are artifacts, i.e., instances of the third type of dummy structure, nevertheless, in some embodiments, such dummy structures have utility in a sense that such dummy structures serve as indications that layout diagram 308B was based on dual-architecture-compatible layout diagram 308A.

FIG. 3B further includes a pictograph 320B. Pictograph 320B is a simplified representation of layout diagram 308B which reflects that layout diagram 308B: represents a device with a non-BPR type of architecture; and includes supra-TR non-dummy structures and supra-TR dummy structures, but which lacks sub-TR non-dummy structures and sub-TR dummy structures.

Again, FIG. 3C is a cross section of layout diagram 308C which is a HiR structure that has a BPR type of architecture, in accordance with some embodiments.

Layout diagram 308C is a HiR structure which has a buried power rail (BPR) type of architecture. From FIG. 3A to FIG. 3C, structures (patterns) are pared from layout diagram 308A for consistency with the BPR type of architecture.

In FIG. 3C, as part of configuring layout diagram 308C with the BPR type of architecture, various structures in some of the supra-TR layers have been removed. More particularly, in FIG. 3C, all of the structures in metallization layers M10-M15, corresponding interconnection layers VIA9-VIA14, in the RV layer and in the AP layer have been removed from columns C1-C5. In some embodiments, fewer than all of the structures in the noted supra-TR layers are removed, i.e., some but not all of the structures in the noted supra-TR layers are retained. In such embodiments in which some but not all of the structures in the noted supra-TR layers are retained; however, at least the via structure at the intersection of interconnection layer VIA9 and column 1 is removed.

Regarding column C3, removing all of the structures in metallization layers M10-M15, corresponding interconnection layers VIA9-VIA14, the RV layer and the AP layer results in a via pillar 312C having portions in columns C3, C4 and C5.

In FIG. 3C, a footprint of sub-TR dummy SS_via in column C1 is substantially contained within a collective footprint of the components of layout diagram 308B which are in the TR layer, namely the TSV in column C1, the G terminal in each of columns C2-C4, and the TSV in column C5. Relative to the X-axis, the sub-TR dummy SS_via in column C1 is located asymmetrically with respect to the components of layout diagram 308C which are in the TR layer, namely the TSV in column C1, the G terminal in each of columns C2-C4, and the TSV in column C5.

FIG. 3C further includes a pictograph 320C. Pictograph 320C is a simplified representation of layout diagram 308C which reflects that layout diagram 308C: represents a device with a BPR type of architecture; and includes supra-TR non-dummy structures and sub-TR non-dummy structures, but which lacks supra-TR dummy structures and sub-TR dummy structures.

FIG. 3D, again, is a top view of layout diagram 308D which corresponds to the cross-section of layout diagram 308B of FIG. 3B. Layout diagram 308D does not include patterns in layers below layer VIA6. In layout diagram 308D, some of the white space in column C1 is called out with reference number 318D. An approximate location of a cut pattern (CP) for interconnection layer VIA6 in column C1 is shown in FIG. 3D. Though layout diagram 308D does not include patterns below layer VIA6, nevertheless an approximate location of supra-TR SS_via 310B (if otherwise included) is shown in FIG. 3D.

Again, FIG. 3E is a top view of layout diagram 308E which corresponds to the cross-section of layout diagram 308C of FIG. 3C. Layout diagram 308E does not include patterns in layers below layer VIA6. Relative to FIG. 3D, among other things, patterns representing a portion of via pillar 312C of FIG. 3C have been added in an area corresponding to white space 318D in layout diagram 308D of FIG. 3D. Though layout diagram 308E does not include patterns below layer VIA6, nevertheless an approximate location of sub-TR SS_via 310C (if otherwise included) is shown in FIG. 2E.

Regarding FIG. 3F, circuit diagram 308F includes a resistor having a high resistance (HiR). Correspondences between portions of circuit diagram 308F and the columns of FIG. 3B are called out in circuit diagram 308F. A path from the left terminal of the HiR reisistor in circuit diagram 308F includes: a first node which has supra-TR portions in column C2; and a second node which has supra-TR portions in column C1. A path from the right terminal of the HiR reisistor in circuit diagram 308F includes: a third node which has supra-TR portions in column C4; and a fourth node which has supra-TR portions in column C5.

FIG. 3G, is similar to FIG. 3F, and so circuit diagram 308G includes a resistor having a high resistance (HiR) .Correspondences between portions of circuit diagram 308G and the columns of FIG. 3C are called out in circuit diagram 308G. However, because circuit diagram 308G corresponds to layout diagram 308C of FIG. 3C, the latter having a BPR-type architecture, a path to the left terminal of the HiR reisistor in circuit diagram 308G includes: a first node which has supra-TR portions in column C2; and a second node which has supra-TR portions in column C1, and a sub-TR SS_via 310C (which is in column C1) between the second node and a third node. A path to the right terminal of the HiR reisistor in circuit diagram 308G includes: a fourth node which has supra-TR portions in column C4; and a fifth node which has supra-TR portions in column C5.

FIG. 4A is a cross-section of a dual-architecture-compatible layout diagram 408A that represents a semiconductor device, in accordance with some embodiments. FIGS. 4B and 4C are cross sections of single-architecture-compatible layout diagrams 408B and 408C that represent corresponding semiconductor devices, in accordance with some embodiments. FIGS. 4D and 4E are corresponding top views of single-architecture-compatible layout diagrams 408D and 408E representing corresponding semiconductor devices, in accordance with some embodiments. FIGS. 4F and 4G are corresponding circuit diagrams 408F and 408G, in accordance with some embodiments.

More particularly, FIGS. 4A, 4B and 4D correspond with each other. FIGS. 4A, 4C and 4E correspond with each other. In some embodiments, layout diagrams 408D and 408E of corresponding FIGS. 4D and 4E are stored on a non-transitory computer-readable medium (see FIG. 10).

FIGS. 4A-4G follow a similar numbering scheme to that of FIGS. 2A-2G. Though corresponding, some components also differ. To help identify components which correspond but nevertheless have differences, the numbering convention uses 4-series numbers for FIGS. 4A-4G while FIGS. 2A-2G uses 2-series numbers. For example, item 412A in FIG. 4A is an instance of a via pillar and corresponding item 212A in FIG. 2A is an instance of a via pillar, and wherein: similarities are reflected in the common root_12A; and differences are reflected in the corresponding leading digit 4 in FIG. 4A and 2 in FIG. 2A. For brevity, the discussion will focus more on differences between FIGS. 4A-4G and FIGS. 2A-2G than on similarities.

The cross section of FIG. 4A is, again, a cross-section of layout diagram 408A. Layout diagram 408A is dual-architecture-compatible and selectively prunable to yield either single-architecture-compatible layout diagram 408B of FIG. 4B (which represents a metal-oxide-metal (MOM) device, e.g., a MOM capacitor, having a non-BPR type of architecture) or single-architecture-compatible layout diagram 408C of FIG. 4C (which represents a MOM device, e.g., a MOM capacitor, having a BPR type of architecture).

For purposes of discussion, layout diagram 408A is organized into columns C1, C2, C3, C4, C5 and C6. For example, column C1 includes a first electrically conductive path which electrically couples the pad in pad layer AP to the buried pad in layer BAP. Among other things, the first electrically conductive path in column C1 includes: supra-TR SS_via 410A(1) which spans metallization layers M0-M15 and corresponding interconnection layers VIA0-VIA14; supra-TR SS_via 410A(1) which spans metallization layers M7-M9 and corresponding interconnection layers VIA6-VIA8; supra-TR SS_via 410A(2) which spans metallization layers M7-M9 and corresponding interconnection layers VIA7-VIA8; and sub-TR SS_vias 26(1) and 426(2) which correspondingly span buried metallization layers BM0-BM5 and corresponding buried interconnection layers BVIA0-BVIA4.

Also, column C6 includes a second electrically conductive path which electrically couples the pad in pad layer AP to the buried pad in layer BAP. Among other things, the second electrically conductive path in column C6 includes: supra-TR SS_via which spans metallization layers M0-M15 and corresponding interconnection layers VIA0-VIA14; and a sub-TR SS_via which spans buried metallization layers BM0-BM5 and corresponding buried interconnection layers BVIA0-BVIA4.

Again, FIG. 4B is a cross section of layout diagram 408B which is a MOM capacitor that has a non-BPR type of architecture, in accordance with some embodiments.

In FIG. 4B, as part of configuring layout diagram 408B with a non-BPR type of architecture, all of the structures in the various sub-TR layers have been removed from columns C1-C5. In some embodiments, fewer than all of the structures in the noted sub-TR layers are removed, i.e., some but not all of the structures in the noted sub-TR layers are retained. In such embodiments in which some but not all of the structures in the noted sub-TR layers are retained, however, at least the BVD structures in columns C1 and C6 are removed.

In FIG. 4B, also as part of configuring layout diagram 408B with the non-BPR type of architecture, a first via structure 416A at the intersection of interconnection layer VIA6 and column C1 is removed. Also, a second via structure at the intersection of interconnection layer VIA6 and column C6 is removed. Removing first via structure 416A and the second via structure from layout diagram 408A results in the following in FIG. 4B: a first supra-TR first via pillar 412B(1) in columns C1-C2 which spans metallization layers M7-M15 and corresponding interconnection layers VIA6-VIA14; a second supra-TR first via pillar 412B(2) in columns C5-C6 which spans metallization layers M7-M15 and corresponding interconnection layers VIA7-VIA14; a first supra-TR SS_via 424(1) in column C1 which spans metallization layers M0-M6 and corresponding interconnection layers VIA0-VIA5; and a second supra-TR SS_via 424(2) in column C6 which spans metallization layers M0-M6 and corresponding interconnection layers VIA0-VIA5.

Each of supra-TR first SS_via 424(1) and 424(2) in corresponding columns C1-C6 is a supra-TR dummy structure and is regarded as an artifact of layout diagram 408B having been based on dual-architecture-compatible layout diagram 408A. As such, supra-TR first SS_via 424(1) in column C1 and supra-TR first SS_via 424(2) in column C6 are included for consistency with layout diagram 408B otherwise being compatible with the BPR type of architecture. In contrast to dummy supra-TR first SS_vias 424(1) and 424(2), the supra-TR first SS_vias in corresponding columns C1 and C6 which form corresponding portions of via pillars 412B(1) and 412B(2) are referred to as supra-TR non-dummy structures. Though such dummy structures are artifacts, i.e., instances of the third type of dummy structure, nevertheless, in some embodiments, such dummy structures have utility in a sense that such dummy structures serve as indications that layout diagram 408B was based on dual-architecture-compatible layout diagram 408A.

FIG. 4B further includes a pictograph 420B. Pictograph 420B is a simplified representation of layout diagram 408B which reflects that layout diagram 408B: represents a device with a non-BPR type of architecture; and includes supra-TR non-dummy structures and supra-TR dummy structures, but which lacks sub-TR non-dummy structures and sub-TR dummy structures.

Again, FIG. 4C is a cross section of layout diagram 408C which is a MOM capacitor that has a BPR type of architecture, in accordance with some embodiments.

In FIG. 4C, as part of configuring layout diagram 408C with the BPR type of architecture, various structures in some of the supra-TR layers have been removed. More particularly, in FIG. 4C, all of the structures in metallization layers M10-M15, corresponding interconnection layers VIA5-VIA14, in the RV layer and in the AP layer have been removed from columns C1-C5. In some embodiments, fewer than all of the structures in the noted supra-TR layers are removed, i.e., some but not all of the structures in the noted supra-TR layers are retained. In such embodiments in which some but not all of the structures in the noted supra-TR layers are retained, however, at least the via structures at the intersection of interconnection layer VIA9 and each of columns C1 and C6 is removed. Layout diagram 408C includes a bottom terminal 422(2) and a top terminal 422(1) of a capacitor.

Regarding column C1, removing all of the structures in metallization layers M10-M15, corresponding interconnection layers VIA9-VIA14, the RV layer and the AP layer results in a first via pillar 412C(1) having portions in columns C1 and C2, and in a second via pillar 412C(2) having portions in columns C5 and C6.

FIG. 4C further includes a pictograph 420C. Pictograph 420C is a simplified representation of layout diagram 408C which reflects that layout diagram 408C: represents a device with a BPR type of architecture; and includes supra-TR non-dummy structures and sub-TR non-dummy structures, but which lacks supra-TR dummy structures and sub-TR dummy structures.

FIG. 4D, again, is a top view of layout diagram 408D which corresponds to the cross-section of layout diagram 408B of FIG. 4B. Layout diagram 408D does not include patterns in layers above layer M7 and below layer M0. Layout diagram 408D is simplified so as to focus on plates of the MOM capacitor. Nevertheless approximate locations of dummy supra-TR SS_via 424(1) in column C1 and dummy supra-TR SS_via 424(2) in column C6 (if otherwise included) are shown in FIG. 4D.

Again, FIG. 4E is a top view of layout diagram 408E which corresponds to the cross-section of layout diagram 408C of FIG. 4C. Layout diagram 408E does not include patterns in layers above layer M7. Layout diagram 408E is simplified so as to focus on plates of the MOM capacitor. Nevertheless approximate locations of structures (if otherwise included) are shown in FIG. 4E as follows: a location of dummy sub-TR SS_via 426(1) in column C1; and a location of dummy sub-TR SS_via 426(2) in column C6.

Regarding FIG. 4F, circuit diagram 408F includes a capacitor C. Correspondences between portions of circuit diagram 408F and the columns of FIG. 4B are called out in circuit diagram 408F. A path from a bottom terminal 422(2) of capacitor C in circuit diagram 408F includes a supra-TR via pillar 412B(1), the latter including supra-TR portions in each of columns C2 and C1. A path from a top terminal 422(1) of capacitor C in circuit diagram 408F includes a supra-TR via pillar 412B(2), the latter including supra-TR portions in each of columns C5 and C6.

FIG. 4G, is similar to FIG. 4F, and so circuit diagram 408G includes a capacitor C. Correspondences between portions of circuit diagram 408G and the columns of FIG. 4C are called out in circuit diagram 408F. A path from a bottom terminal 422(2) of capacitor C in circuit diagram 408G includes: a supra-TR via pillar 412C(1), the latter including supra-TR portion in each of columns C2 and C1; and sub-TR SS_via 426(1) having portions in column C1. A path from top terminal 422(1) of capacitor C in circuit diagram 408F includes: a supra-TR via pillar 412C(2), the latter including supra-TR portions in each of columns C5 and C6; and sub-TR SS_via 426(2) having portions in column C6.

Figures 5A, 5B, 5C:
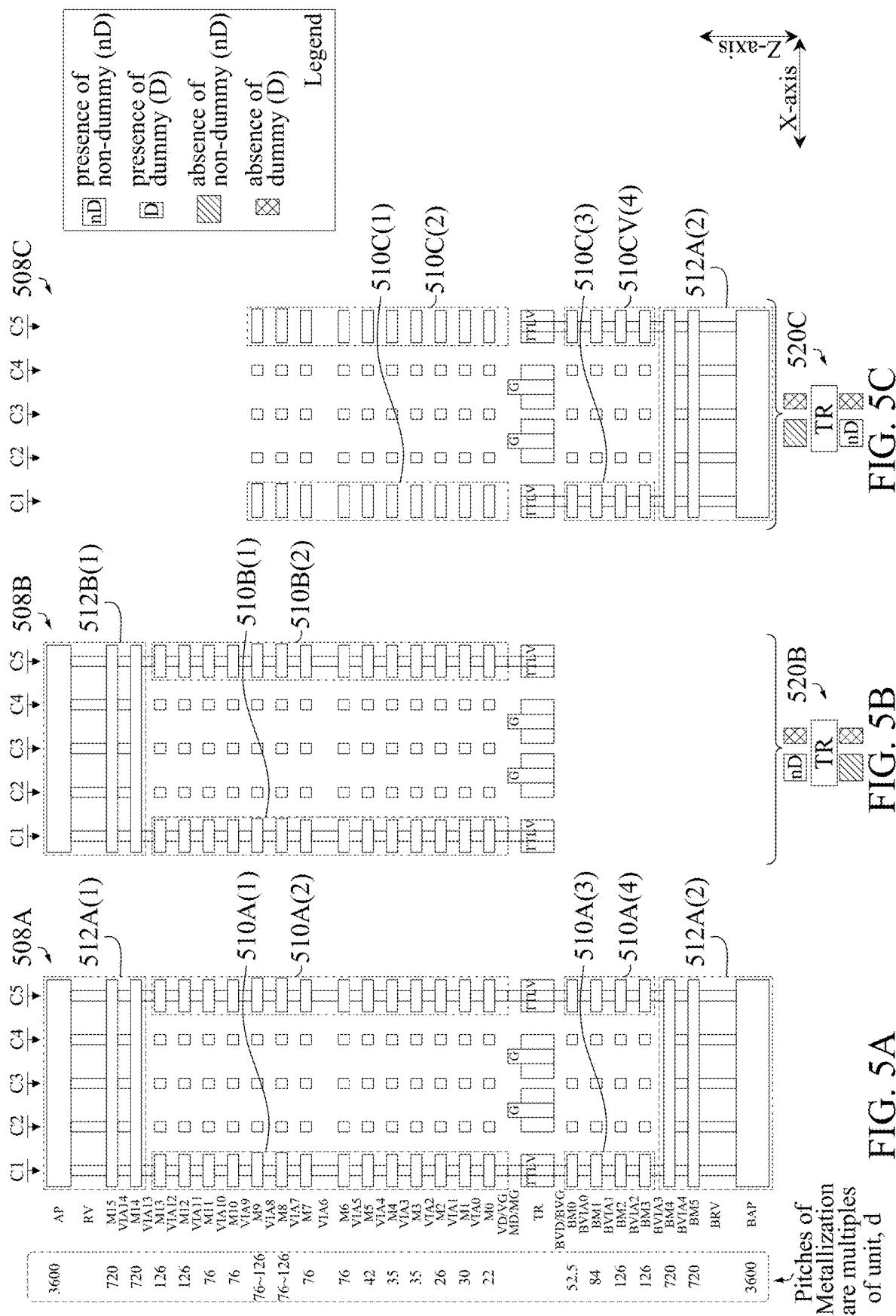
FIGS. 5A, 5B and 5C are corresponding cross sections.

FIG. 5A is a cross-section of a dual-architecture-compatible layout diagram 508A that represents a semiconductor device, in accordance with some embodiments. FIGS. 5B and 5C are cross sections of corresponding single-architecture-compatible layout diagrams 508B and 508C, in accordance with some embodiments. FIGS. 5D and 5E are corresponding top views of single-architecture-compatible layout diagrams 508D and 508E representing corresponding semiconductor devices, in accordance with some embodiments. FIGS. 5F and 5G are corresponding circuit diagrams 508F and 508G, in accordance with some embodiments.

FIGS. 5A-5G follow a similar numbering scheme to that of FIGS. 2A-2G. Though corresponding, some components also differ. To help identify components which correspond but nevertheless have differences, the numbering convention uses 5-series numbers for FIGS. 5A-5G while FIGS. 2A-2G uses 2-series numbers. For example, item 512A(2) in FIG.

5A is an instance of a via pillar and corresponding item 212A in FIG. 2A is an instance of a via pillar, and wherein: similarities are reflected in the common root_12A; and differences are reflected in the corresponding leading digit 5 in FIG. 5A and 2 in FIG. 2A. For brevity, the discussion will focus more on differences between FIGS. 5A-5G and FIGS. 2A-2G than on similarities.

The cross section of FIG. 5A is, again, a cross-section of layout diagram 508A. Layout diagram 508A is dual-architecture-compatible and selectively prunable to yield either single-architecture-compatible layout diagram 508B of FIG. 5B (which represents an inductor having a non-BPR type of architecture) or single-architecture-compatible layout diagram 508C of FIG. 5C (which represents an inductor having a BPR type of architecture).

For purposes of discussion, layout diagram 508A is organized into columns C1, C2, C3, C4 and C5. Column C1 includes a first electrically conductive path which electrically couples a first end of a supra-TR via pillar 512A(1) to a first end of a sub-TR via pillar 512A(2). Among other things, the first electrically conductive path in column C1 includes: a supra-TR SS_via 510A which spans metallization layers M0-M13 and corresponding interconnection layers VIA0-VIA13; and a sub-TR SS_via 510A(3) which spans buried metallization layers BM0-BM3 and corresponding buried interconnection layers BVIA0-BVIA3. Column C5 includes a second electrically conductive path which electrically couples a second end of supra-TR first via pillar 512A(1) to a second end of a sub-TR second via pillar 512A(2). Among other things, the second electrically conductive path in column C5 includes: a supra-TR SS_via 510A(2) which spans metallization layers M0-M13 and corresponding interconnection layers VIA0-VIA13; and a sub-TR SS_via 510A(4) which spans buried metallization layers BM0-BM3 and corresponding buried interconnection layers BVIA0-BVIA3.

Again, FIG. 5B is a cross section of layout diagram 508B which is an inductor that has a non-BPR type of architecture, in accordance with some embodiments.

In FIG. 5B, as part of configuring layout diagram 508B with a non-BPR type of architecture, all of the structures in the various sub-TR layers have been removed from columns C1-C5. In some embodiments, fewer than all of the structures in the noted sub-TR layers are removed, i.e., some but not all of the structures in the noted sub-TR layers are retained. In such embodiments in which some but not all of the structures in the noted sub-TR layers are retained, however, at least the BVD structures in columns C1 and C5 are removed. Among other things, layout diagram 508B includes non-dummy supra-TR structures including: supra-TR SS_vias 510B(1) and 510B(2); and non-dummy supra-TR via pillar 512A(1).

FIG. 5B further includes a pictograph 520B. Pictograph 520B is a simplified representation of layout diagram 508B which reflects that layout diagram 508B: represents a device with a non-BPR type of architecture; and includes supra-TR non-dummy structures, but which lacks supra-TR dummy structures, and which lacks sub-TR non-dummy structures and sub-TR dummy structures.

Again, FIG. 5C is a cross section of layout diagram 508C which is an inductor that has a BPR type of architecture, in accordance with some embodiments.

In FIG. 5C, as part of configuring layout diagram 508C with the BPR type of architecture, various structures in some of the supra-TR layers have been removed. More particularly, in FIG. 5C, all of the structures in metallization layers M10-M15, corresponding interconnection layers VIA9-VIA14, in the RV layer and in the AP layer have been removed from columns C1-C5. In some embodiments, fewer than all of the structures in the noted supra-TR layers are removed, i.e., some but not all of the structures in the noted supra-TR layers are retained. In such embodiments in which some but not all of the structures in the noted supra-TR layers are retained, however, at least the via structures at the intersection of interconnection layer VIA9 and each of columns C1 and C5 is removed. Regarding column C1, removing all of the structures in metallization layers M10-M15, corresponding interconnection layers VIA9-VIA14, the RV layer and the AP layer results in a via pillar 512C(2).

In FIG. 5C, also as part of configuring layout diagram 508C with the BPR type of architecture, the following additional structures are removed: the VD structures in each of columns C1 and C5; the MD structures in each of columns C1 and C5; the via structures at the intersections of column C1 and interconnection layers VIA0-VIA8; and the via structures at the intersections of column C5 and interconnection layers VIA0-VIA8. By removing the additional structures, a supra-TR routing arrangement results at the intersections of column C1 and metallization layers M0-M9. Among other things, layout diagram 508C includes dummy supra-TR structures (including supra-TR SS_vias 510C(1) and 510C(2)) and non-dummy sub-TR structures including: sub-TR SS_vias 510C(3) and 510C(4); and sub-TR via pillar 512C(2).

FIG. 5C further includes a pictograph 520C. Pictograph 520C is a simplified representation of layout diagram 508C which reflects that layout diagram 508C: represents a device with a BPR type of architecture; and includes supra-TR non-dummy structures and sub-TR non-dummy structures, but which lacks supra-TR dummy structures and sub-TR dummy structures.

FIG. 5D, again, is a top view of layout diagram 508D which corresponds to the cross-section of layout diagram 508B of FIG. 5B.

Layout diagram 508D does not include patterns in layers below layer M14, and represents one of layers M14, M15 or AP. Though layout diagram 508D does not include patterns in layers below layer M14, nevertheless approximate underlying locations of non-dummy supra-TR SS_via 510B(1) in column C1 and non-dummy supra-TR SS_via 510B(2) in column C5 (if otherwise included) are shown in FIG. 5D.

Again, FIG. 5E is a top view of layout diagram 508E which corresponds to the cross-section of layout diagram 508C of FIG. 5C. Layout diagram 508E does not include patterns in layers above layer BM4, and represents one of layers BM4, BM5 or BAP. Though layout diagram 508E does not include patterns in layers above layer BM4, nevertheless approximate overlying locations of non-dummy sub-TR SS_via 510C(3) in column C1 and non-dummy supra-TR SS_via 510C(4) in column C5 (if otherwise included) are shown in FIG. 5E.

Regarding FIG. 5F, circuit diagram 508F includes an inductor IND. Correspondences between portions of circuit diagram 508F and the columns of FIG. 5B are called out in circuit diagram 508F. A path from a top terminal of inductor IND in circuit diagram 508F includes a supra-TR via pillar 510B(1), the latter including supra-TR portions in column C1 that culminate in a TTLV. A path from a bottom terminal of inductor IND in circuit diagram 508F includes a supra-TR via pillar 510B(2), the latter including supra-TR portions in column C6 that culminate in a TTLV.

FIG. 5G, is similar to FIG. 5F, and so circuit diagram 508G includes an inductor IND. Correspondences between portions of circuit diagram 508G and the columns of FIG.

5C are called out in circuit diagram 508G. A path from a top terminal of inductor IND in circuit diagram 508G includes a sub-TR via pillar 510C(3), the latter including sub-TR portions in column C1 that culminate in a TTLV. A path from a bottom terminal of inductor IND in circuit diagram 508G includes a sub-TR via pillar 510C(2), the latter including sub-TR portions in column C6 that culminate in a TTLV.

Figure 6D:
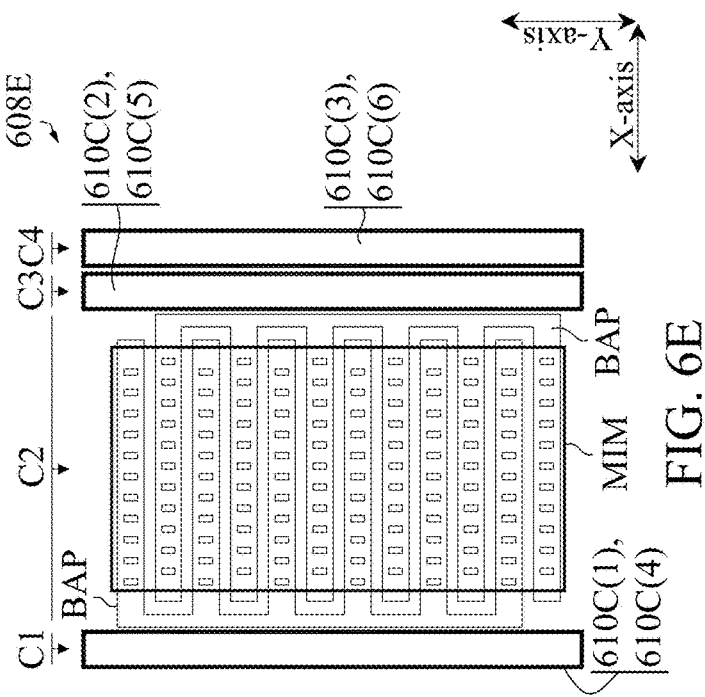
FIGS. 6D and 6E are corresponding top views, in accordance with some embodiments.
Figure 6E:
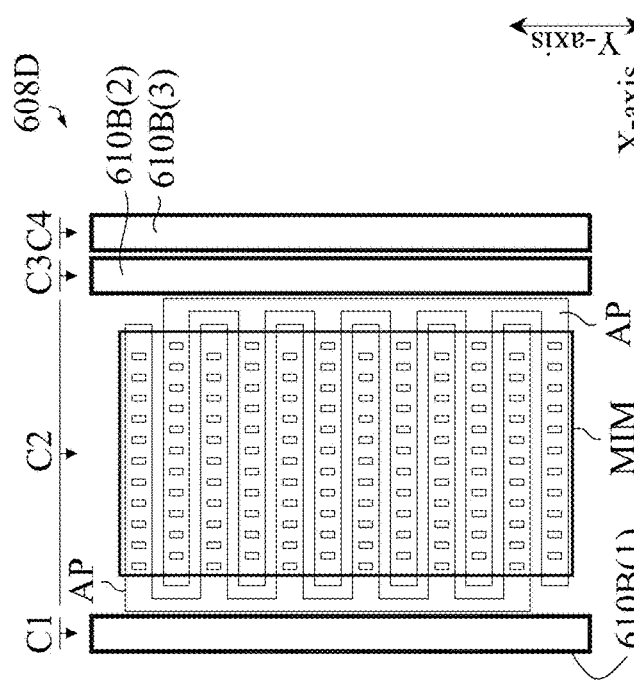
Figure 6F:
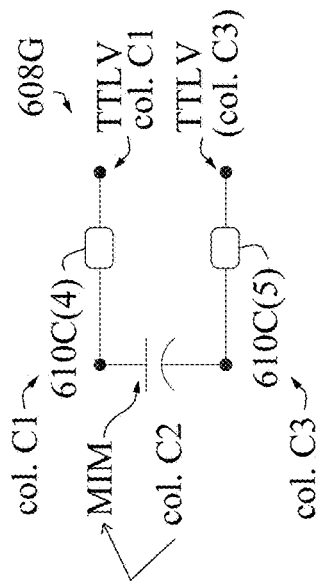
FIGS. 6F and 6G are corresponding circuit diagrams, in accordance with some embodiments.
Figure 6G:
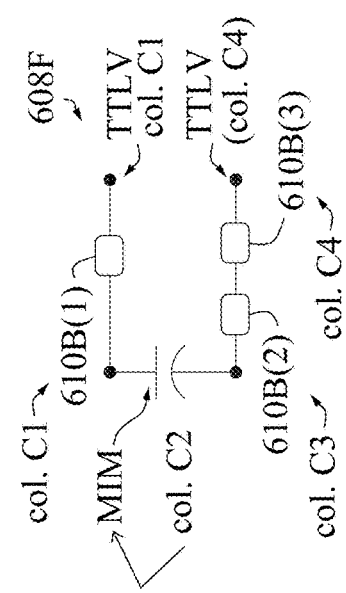

FIG. 6A is a cross-section of a dual-architecture-compatible layout diagram 608A that represents a semiconductor device, in accordance with some embodiments. FIGS. 6B and 6C are cross sections of corresponding single-architecture-compatible layout diagrams 608B and 608C, in accordance with some embodiments. FIGS. 6D and 6E are corresponding top views of single-architecture-compatible layout diagrams 608D and 608E representing corresponding semiconductor devices, in accordance with some embodiments. FIGS. 6F and 6G are corresponding circuit diagrams 608F and 608G, in accordance with some embodiments.

FIGS. 6A-6G follow a similar numbering scheme to that of FIGS. 2A-2G. Though corresponding, some components also differ. To help identify components which correspond but nevertheless have differences, the numbering convention uses 6-series numbers for FIGS. 6A-6G while FIGS. 2A-2G uses 2-series numbers. For example, item 612A in FIG. 6A is an instance of a via pillar and corresponding item 212A in FIG. 2A is an instance of a via pillar, and wherein: similarities are reflected in the common root_12A; and differences are reflected in the corresponding leading digit 6 in FIG. 6A and 2 in FIG. 2A. For brevity, the discussion will focus more on differences between FIGS. 6A-6G and FIGS. 2A-2G than on similarities.

The cross section of FIG. 6A is, again, a cross-section of layout diagram 608A. Layout diagram 608A is dual-architecture-compatible and selectively prunable to yield either single-architecture-compatible layout diagram 608B of FIG. 6B (which represents a Metal-Insulator-Metal (MIM) device, e.g., a capacitor, having a non-BPR type of architecture) or single-architecture-compatible layout diagram 608C of FIG. 6C (which represents a MIM capacitor having a BPR type of architecture). In some embodiments, the MIM capacitor is a super high density (SHD) type of MIM capacitor (SHDMIM capacitor).

For purposes of discussion, layout diagram 608A is organized into columns C1, C2, C3 and C4. For example, column C4 includes a first electrically conductive path which electrically couples the pad in pad layer AP to the buried pad in layer BAP. Among other things, the first electrically conductive path in column C4 includes: a first supra-TR first SS_via 612A(1) which spans metallization layers M0-M15 and corresponding interconnection layers VIA0-VIA14; and a first sub-TR first SS_via which spans buried metallization layers BM0-BM5 and corresponding buried interconnection layers BVIA0-BVIA4.

In FIG. 6A, column C3 includes a second electrically conductive path which electrically couples the pad in pad layer AP to the buried pad in layer BAP. Among other things, the second electrically conductive path in column C3 includes: a second supra-TR second SS_via 610A(2) which spans metallization layers M0-M15 and corresponding interconnection layers VIA0-VIA14; and a second sub-TR second SS_via which spans buried metallization layers BM0-BM5 and corresponding buried interconnection layers BVIA0-BVIA4. Together, supra-TR first SS_via 610A(1) and second supra-TR first via pillar 612A(2) represent a supra-TR via pillar 612A.

Column C1 includes a third electrically conductive path which electrically couples the pad in pad layer AP to the buried pad in layer BAP. Among other things, the third electrically conductive path in column C3 includes: a third supra-TR second SS_via which spans metallization layers M0-M15 and corresponding interconnection layers VIA0-VIA14; and a third sub-TR second SS_via which spans buried metallization layers BM0-BM5 and corresponding buried interconnection layers BVIA0-BVIA4.

Layout diagram 608A further includes a supra-TR Super High Density (SHD) MIM structure at the intersection of column C2 and the RV layer, and a sub-TR SHD MIM structure at the intersection of column C2 and the BRV layer. Corresponding portions of the supra-TR SHD MIM structure are electrically coupled to the RV contact structures in each of columns C1 and C3. Corresponding portions of the sub-TR SHD MIM structure are electrically coupled to the BRV contact structures in each of columns C1 and C3.

Again, FIG. 6B is a cross section of layout diagram 608B which is a MIM capacitor that has a non-BPR type of architecture, in accordance with some embodiments.

In FIG. 6B, as part of configuring layout diagram 608B with a non-BPR type of architecture, all of the structures in the various sub-TR layers have been removed from columns C1-C4. In some embodiments, fewer than all of the structures in the noted sub-TR layers are removed, i.e., some but not all of the structures in the noted sub-TR layers are retained. In such embodiments in which some but not all of the structures in the noted sub-TR layers are retained, however, at least the BVD structures in columns C1, C3 and C4 are removed.

FIG. 6B further includes a pictograph 620B. Pictograph 620B is a simplified representation of layout diagram 608B which reflects that layout diagram 608B: represents a device with a non-BPR type of architecture; and includes supra-TR non-dummy structures, but which lacks supra-TR dummy structures, sub-TR non-dummy structures and sub-TR dummy structures.

Again, FIG. 6C is a cross section of layout diagram 608C which is a MOM capacitor that has a BPR type of architecture, in accordance with some embodiments.

In FIG. 6C, as part of configuring layout diagram 608C with the BPR type of architecture, various structures in some of the supra-TR layers have been removed. More particularly, in FIG. 6C, all of the structures in metallization layers M10-M15, corresponding interconnection layers VIA9-VIA14, in the RV layer and in the AP layer have been removed from columns C1-C5. In some embodiments, fewer than all of the structures in the noted supra-TR layers are removed, i.e., some but not all of the structures in the noted supra-TR layers are retained. In such embodiments in which some but not all of the structures in the noted supra-TR layers are retained; however, at least the via structures at the intersection of interconnection layer VIA9 and each of columns C1, C3 and C5 is removed.

By removing the supra-TR structures in interconnection layer VIA9 and above, the follow result: a supra-TR SS_via in column C4 (spanning metallization layers M0-M9 and corresponding interconnection layers VIA0-VIA8) which is a supra-TR dummy structure; and a sub-TR SS-via in column C4 (spanning buried metallization layers BM0-BM5 and corresponding buried interconnection layers BVIA0-BVIA4) which is a sub-TR dummy structure. It is noted that the supra-TR dummy structure in column C4 and the sub-TR dummy structure in column C4 are electrically coupled by, among other things, a TSV structure in the TR layer at column C4. Such dummy structures are regarded as artifacts of layout diagram 608B having been based on dual-architecture-compatible layout diagram 608A. Though such dummy structures are artifacts, i.e., instances of the third type of dummy structure, nevertheless, in some embodiments, such dummy structures have utility in a sense that such dummy structures serve as indications that layout diagram 608C was based on dual-architecture-compatible layout diagram 608A.

In FIG. 6C, a footprint of the supra-TR dummy structure and the sub-TR dummy structure in column C4 is substantially contained within a collective footprint of the components of layout diagram 608C which are in the TR layer, namely the TSV in each of columns C1, C3 and C4. Relative to the X-axis, the supra-TR dummy structure and the sub-TR dummy structure in column C4 is located asymmetrically with respect to the components of layout diagram 608C which are in the TR layer, namely the TSV in each of columns C1, C3 and C4.

FIG. 6C further includes a pictograph 620C. Pictograph 620C is a simplified representation of layout diagram 608C which reflects that layout diagram 608C: represents a device with a BPR type of architecture; and includes supra-TR non-dummy structures, supra-TR dummy structures, sub-TR non-dummy structures and sub-TR dummy structures.

FIG. 6D, again, is a top view of layout diagram 608D which corresponds to the cross-section of layout diagram 608B of FIG. 6B. Layout diagram 608D includes patterns in layer RV. Though layout diagram 608D does not include patterns in layers other than layer RV, nevertheless approximate locations of underlying non-dummy supra-TR SS_vias 610B(1) in column C1, 610B(2) in column C3 and 610B(3) in column C4 (if otherwise included) are shown in FIG. 6D.

Again, FIG. 6E is a top view of layout diagram 608E which corresponds to the cross-section of layout diagram 608C of FIG. 6C. Layout diagram 608E includes patterns in layer BRV. Though layout diagram 608E does not include patterns in layers other than layer BRV, nevertheless approximate locations of overlying non-dummy sub-TR SS_vias 610C(4) in column C1, 610C(5) in column C3 and 610C(6) in column C4, and overlying non-dummy supra-TR SS_vias 610C(1) in column C1, 610C(2) in column C3 and 610C(3) in column C4 (if otherwise included) are shown in FIG. 6E.

Regarding FIG. 6F, circuit diagram 608F includes MIM type capacitor MIM. Correspondences between portions of circuit diagram 608F and the columns of FIG. 6B are called out in circuit diagram 608F. A path from a top terminal of capacitor MIM in circuit diagram 608F includes a supra-TR via pillar 610B(1) in column C1 that culminate in a TTLV. A path from a bottom terminal of capacitor MIM in circuit diagram 608F includes a supra-TR via pillar 610B(2) in column C3 and a supra-TR via pillar 610B(3) in column C4 that culminate in a TTLV.

FIG. 6G, is similar to FIG. 6F, and so circuit diagram 608G includes a capacitor MIM. Correspondences between portions of circuit diagram 608G and the columns of FIG. 6C are called out in circuit diagram 608G. A path from a top terminal of capacitor MIM in circuit diagram 608G includes a sub-TR via pillar 610C(4) and a supra-TR via pillar 610C(1) in column C1. A path from a bottom terminal of capacitor MIM in circuit diagram 608G includes a sub-TR via pillar 610C(5) and a supra-TR via pillar 610C(2) in column C3.

Figures 7A, 7B, 7C:
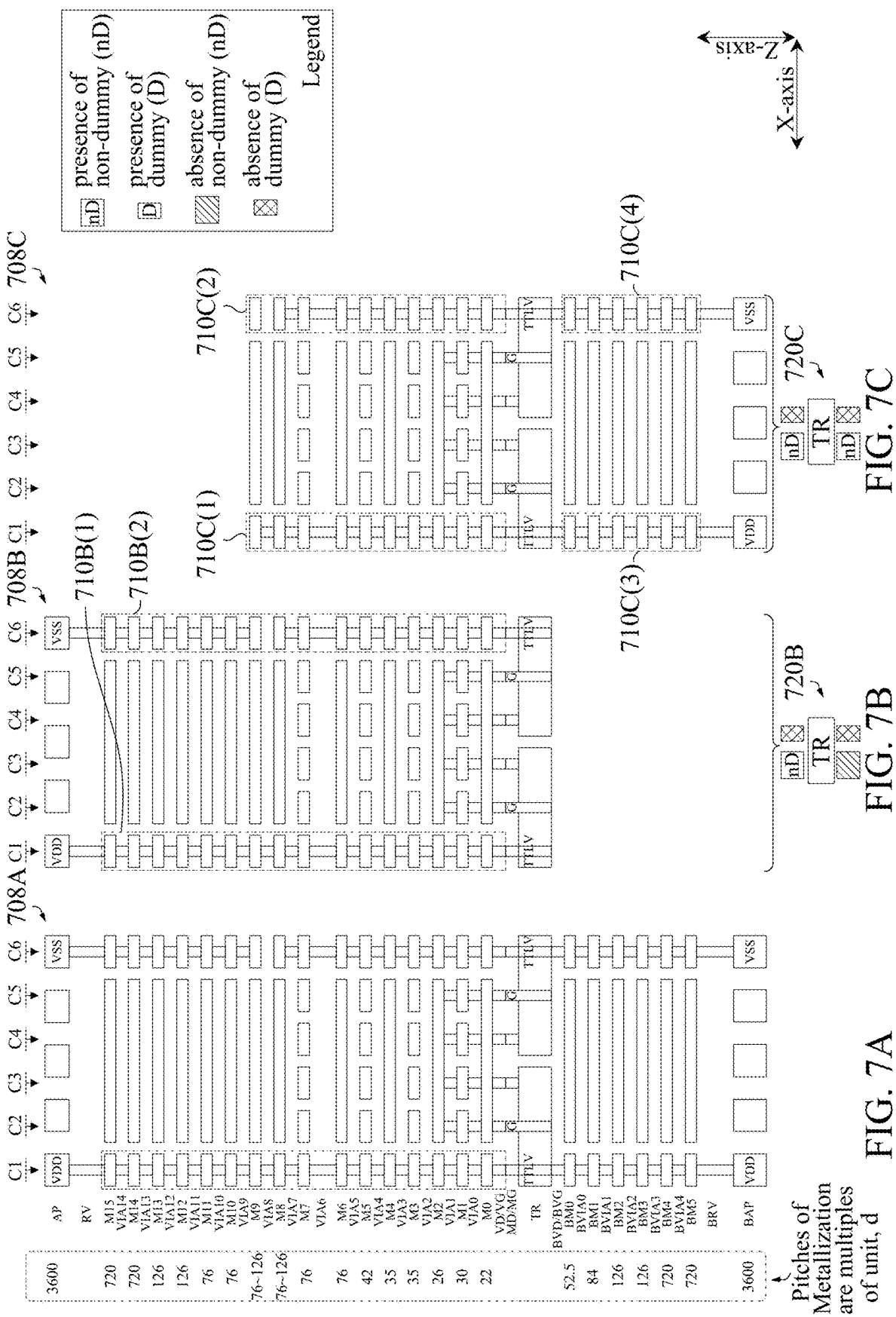
FIGS. 7A, 7B and 7C are corresponding cross sections.

FIG. 7A is a cross-section of a dual-architecture-compatible layout diagram 708A that represents a semiconductor device, in accordance with some embodiments. FIGS. 7B and 7C are cross sections of corresponding single-architecture-compatible layout diagrams 708B and 708C, in accordance with some embodiments. FIGS. 7D and 7E are corresponding top views of single-architecture-compatible layout diagrams 708D and 708E, in accordance with some embodiments. FIGS. 7F and 7G are corresponding circuit diagrams 708F and 708G, in accordance with some embodiments.

More particularly, FIGS. 7B, 7D and 7F correspond with each other. FIGS. 7C, 7E and 7G correspond with each other. In some embodiments, layout diagrams 708D and 708E of corresponding FIGS. 7D and 7E are stored on a non-transitory computer-readable medium (see FIG. 10).

FIGS. 7A-7G follow a similar numbering scheme to that of FIGS. 2A-2G. Though corresponding, some components also differ. To help identify components which correspond but nevertheless have differences, the numbering convention uses 7-series numbers for FIGS. 7A-7G while FIGS. 2A-2G uses 2-series numbers. For example, item 710A in FIG. 7A is an instance of an SS_via and corresponding item 210A in FIG. 2A is an instance of an SS_via, and wherein: similarities are reflected in the common root_10A; and differences are reflected in the corresponding leading digit 7 in FIG. 7A and 2 in FIG. 2A. For brevity, the discussion will focus more on differences between FIGS. 7A-7G and FIGS. 2A-2G than on similarities.

The cross section of FIG. 7A is, again, a cross-section of layout diagram 708A. Layout diagram 708A is dual-architecture-compatible and selectively prunable to yield either single-architecture-compatible layout diagram 708B of FIG. 7B (which represents a metal oxide semiconductor field effect transistor (MOSFET) having a non-BPR type of architecture) or single-architecture-compatible layout diagram 708C of FIG. 7C (which represents a MOSFET having a BPR type of architecture). For purposes of discussion, layout diagram 708A is organized into columns C1, C2, C3, C4, C5 and C6.

Again, FIG. 7B is a cross section of layout diagram 708B which is a MOSFET that has a non-BPR type of architecture, in accordance with some embodiments.

In FIG. 7B, as part of configuring layout diagram 708B with a non-BPR type of architecture, all of the structures in the various sub-TR layers have been removed from columns C1-C5. Layout diagram 708B includes supra-TR SS_vias 710B(1) in column C1 and 710B(2) in column C6. In some embodiments, fewer than all of the structures in the noted sub-TR layers are removed, i.e., some but not all of the structures in the noted sub-TR layers are retained. In such embodiments in which some but not all of the structures in the noted sub-TR layers are retained, however, at least the BVD structures in columns C1 and C6 are removed.

FIG. 7B further includes a pictograph 720B. Pictograph 720B is a simplified representation of layout diagram 708B which reflects that layout diagram 708B: represents a device with a non-BPR type of architecture; and includes supra-TR non-dummy structures, but which lacks supra-TR dummy structures, sub-TR non-dummy structures and sub-TR dummy structures.

Again, FIG. 7C is a cross section of layout diagram 708C which is an inductor that has a BPR type of architecture, in accordance with some embodiments.

In FIG. 7C, as part of configuring layout diagram 708C with the BPR type of architecture, various structures in some of the supra-TR layers have been removed. More particularly, in FIG. 7C, all of the structures in metallization layers M10-M15, corresponding interconnection layers VIA9-VIA14, in the RV layer and in the AP layer have been removed from columns C1-C5.

FIG. 7C further includes a pictograph 720C. Pictograph 720C is a simplified representation of layout diagram 708C which reflects that layout diagram 708C: represents a device with a BPR type of architecture; and includes supra-TR non-dummy structures and sub-TR non-dummy structures, but which lacks supra-TR dummy structures and sub-TR dummy structures.

FIG. 7D, again, is a top view of layout diagram 708D which corresponds to the cross-section of layout diagram 708B of FIG. 7B. For simplification, layout diagram 708D does includes patterns in the TR layer, layer M0 and layer VD/VG.

Again, FIG. 7E is a top view of layout diagram 708E which corresponds to the cross-section of layout diagram 708C of FIG. 7C. For simplification, layout diagram 708E does includes patterns in the TR layer, layer M0 and layer VD/VG. Though layout diagram 708E does not includes patterns other than patterns in the TR layer, layer M0 and layer VD/VG, nevertheless approximate underlying locations of BVD structures in layer BVD/BVG, and structures in layer BM0, (if otherwise included) are shown in FIG. 7E.

Regarding FIG. 7F, circuit diagram 708F includes a circuit 728, e.g., an inverter circuit. Correspondences between portions of circuit diagram 708F and the columns of FIG. 7B are called out in circuit diagram 708F. A path which provides a first reference voltage, e.g., VDD, to circuit 728 includes a supra-TR SS_via 710B(1) in column C1. A path which provides second reference voltage, e.g., VSS, to circuit 728 includes a supra-TR SS_via 710B(2) in column C6.

Regarding FIG. 7G, circuit diagram 708G includes a circuit 728, e.g., an inverter circuit. Correspondences between portions of circuit diagram 708G and the columns of FIG. 7C are called out in circuit diagram 708G. A path which provides a first reference voltage, e.g., VDD, to circuit 728 includes a supra-TR SS_via 710C(1) and a sub-TR SS_via 710C(3) in column C1. A path which provides second reference voltage, e.g., VSS, to circuit 728 includes a supra-TR _SS_via 710C(2) and a sub-TR SS_via 710C(4) in column C6.

Figure 8:
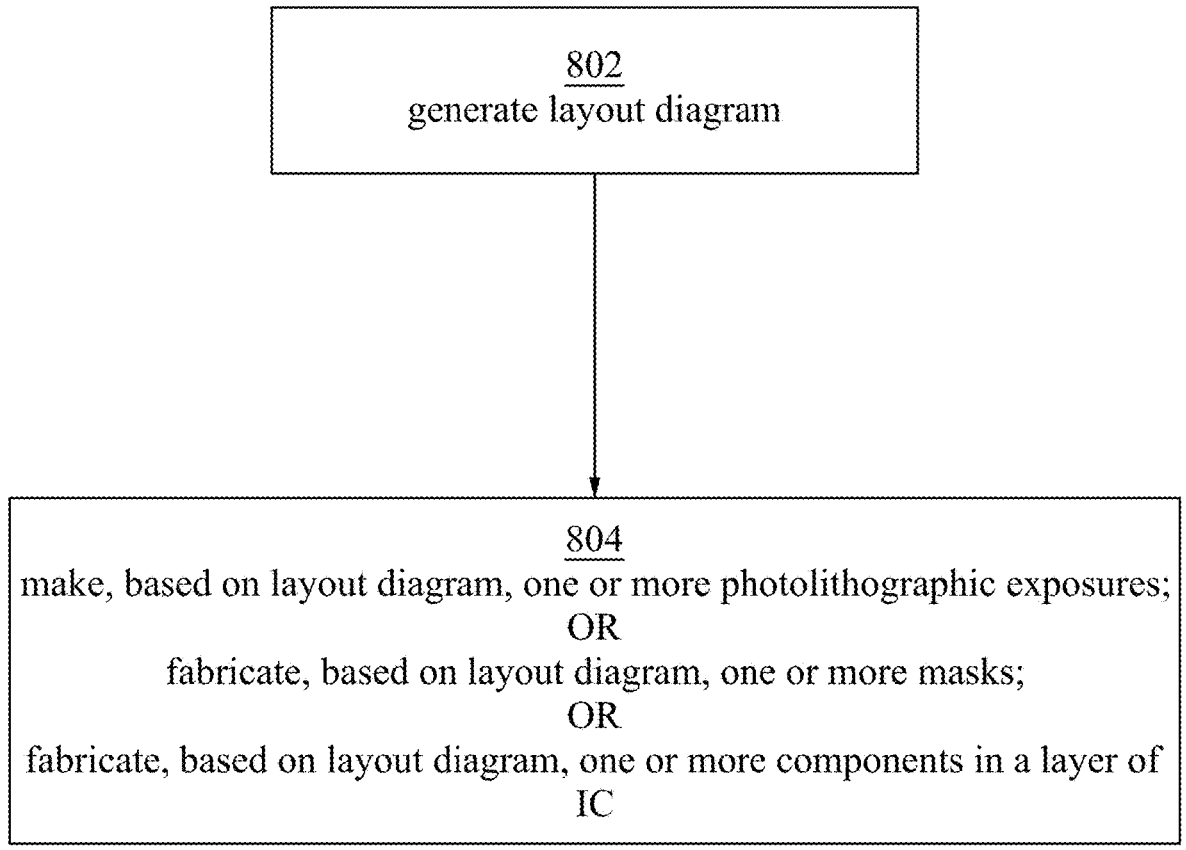
FIG. 8 is a flowchart of a method of manufacturing a semiconductor device, in accordance with some embodiments.

FIG. 8 is a flowchart of a method 800 of manufacturing a semiconductor device, in accordance with some embodiments.

Method 800 is implementable, for example, using EDA system 1000 (FIG. 10, discussed below) and an integrated circuit (IC), manufacturing system 1100 (FIG. 11, discussed below), in accordance with some embodiments. Examples of a semiconductor device which can be manufactured according to method 800 include semiconductor device 100 of FIG. 1, semiconductor devices corresponding to various ones of the layout diagrams disclosed herein, or the like.

In FIG. 8, method 800 includes blocks 802-804. At block 802, a layout diagram is generated which, among other things, includes one or more of layout diagrams disclosed herein, or the like. Block 802 is implementable, for example, using EDA system 1000 (FIG. 10, discussed below), in accordance with some embodiments. From block 802, flow proceeds to block 804.

At block 804, based on the layout diagram, at least one of (A) one or more photolithographic exposures are made or (B) one or more semiconductor masks are fabricated or (C) one or more components in a layer of a semiconductor device are fabricated. See discussion below of FIG. 11.

Figure 9:
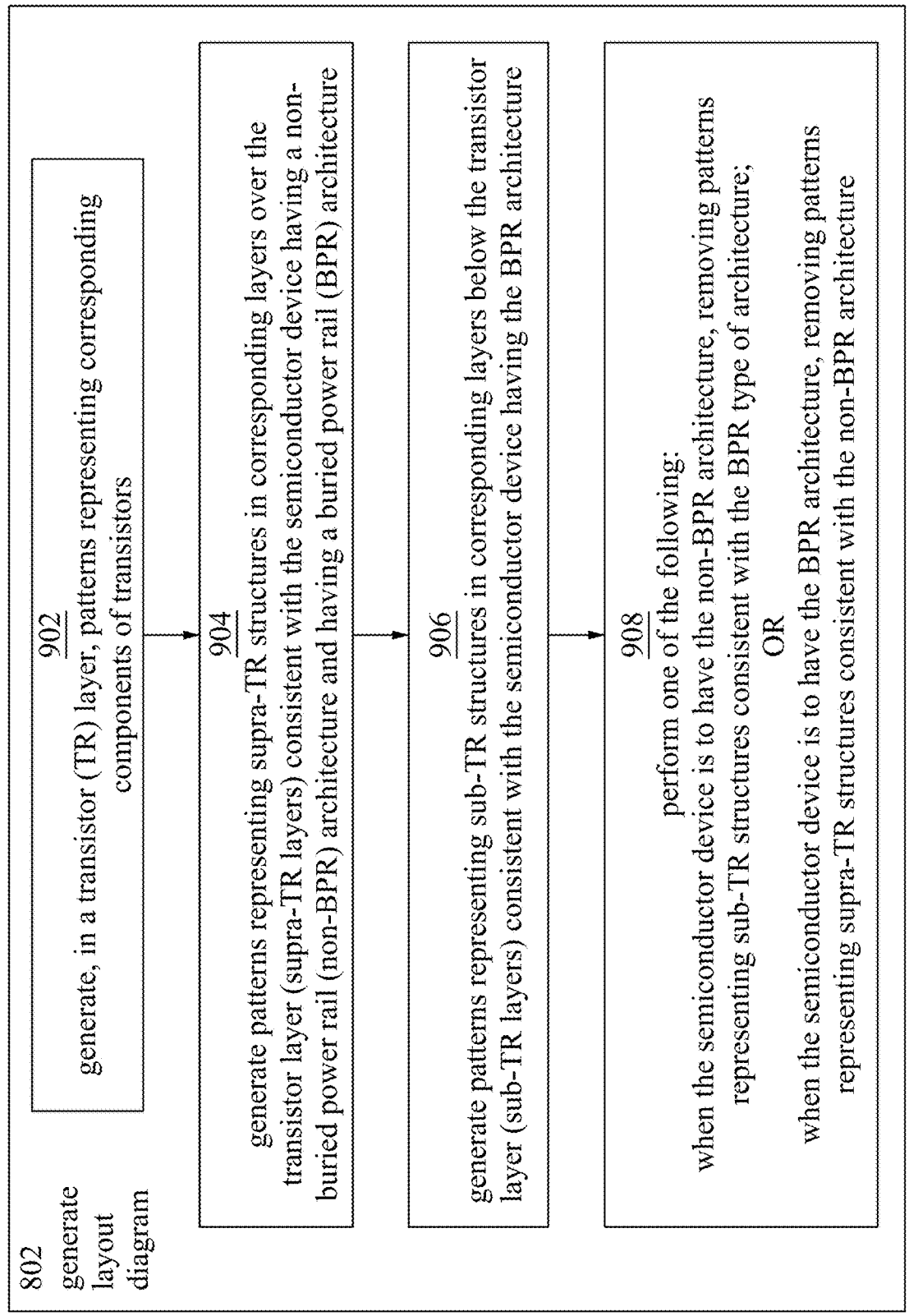
FIG. 9 is a flowchart of a method of manufacturing a semiconductor device, in accordance with some embodiments.

FIG. 9 is a flowchart of a method of manufacturing a semiconductor device, in accordance with some embodiments.

More particularly, the flowchart of FIG. 9 shows additional blocks included in block 802 of FIG. 8, in accordance with one or more embodiments. In FIG. 9, block 802 includes blocks 902-908. At block 902, patterns representing corresponding components of a transistor are generated in a transistor layer of the layout diagram. Examples of the components of a transistor in the transistor layer are the B terminal, D terminal, G terminal and S terminal in the TR layer of FIG. 2A. From block 902, flow proceeds to block 904.

At block 904, patterns representing supra-TR structures are generated in corresponding layers of the layout diagram over the transistor layer which would be consistent with the semiconductor device having a non-buried power rail (non-BPR) architecture and which would be consistent with the semiconductor device having a buried power rail (BPR) architecture. Examples of such supra-TR structures are the supra-TR structures in each of columns C1-C5 of FIG. 2A. From block 904, flow proceeds to block 906.

At block 906, patterns representing sub-TR structures are generated in corresponding layers of the layout diagram below the transistor layer (sub-TR layers) consistent with the semiconductor device having the BPR architecture. Examples of such sub-TR structures are the sub-TR structures in each of columns C1-C5 of FIG. 2A. From block 906, flow proceeds to block 908.

At block 908, one of the following is performed: when the semiconductor device is to have the non-BPR architecture, then patterns representing sub-TR structures consistent with the BPR-type of architecture are removed; or, if the semiconductor device is to have the BPR architecture, then patterns representing supra-TR structures consistent with the non-BPR architecture are removed. An example of having removed patterns representing sub-TR structures so as to be consistent with the non-BPR-type of architecture is having removed patterns representing sub-TR structures of layout diagram 208A of FIG. 2A as part of producing layout diagram 208B of FIG. 2B. An example of having removed some of the patterns representing supra-TR structures so as to be consistent with the BPR-type of architecture is having removed all of the patterns representing supra-TR structures in metallization layers M10-M15, corresponding interconnection layers VIA9-VIA14, in the RV layer and in the AP layer from columns C1-C5 of layout diagram 208A of FIG. 2A as part of producing layout diagram 208C of FIG. 2C.

Figure 10:
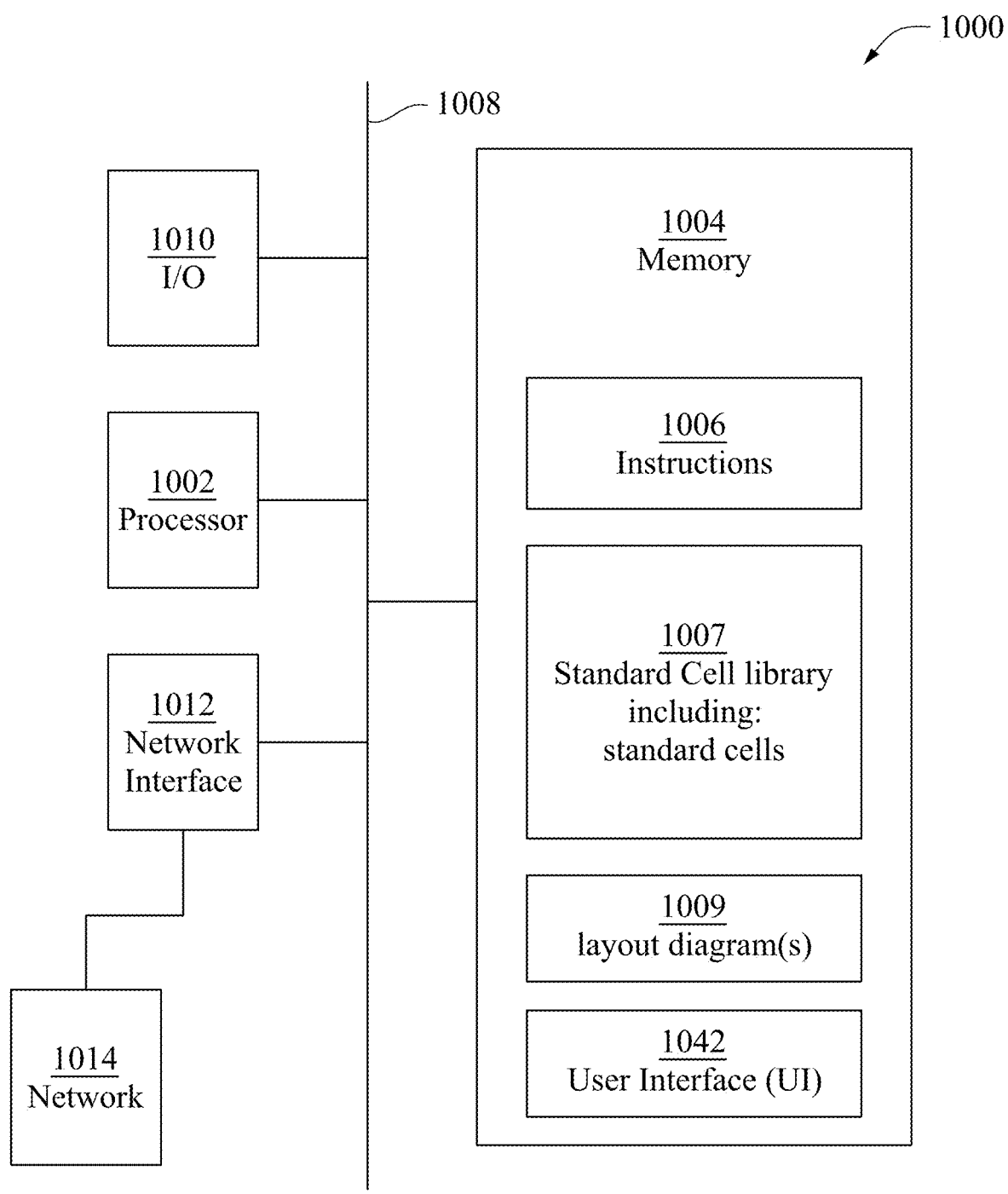
FIG. 10 is a block diagram of an electronic design automation (EDA) system, in accordance with some embodiments.

In numerical sequence, FIG. 10 follows FIG. 9. However, rather than have the discussion turn next to FIG. 10, instead the discussion turns next to FIGS. 12A-12B. After FIGS. 12A-12B have been discussed, the discussion will return to FIGS. 10 and 11.

Figure 11:
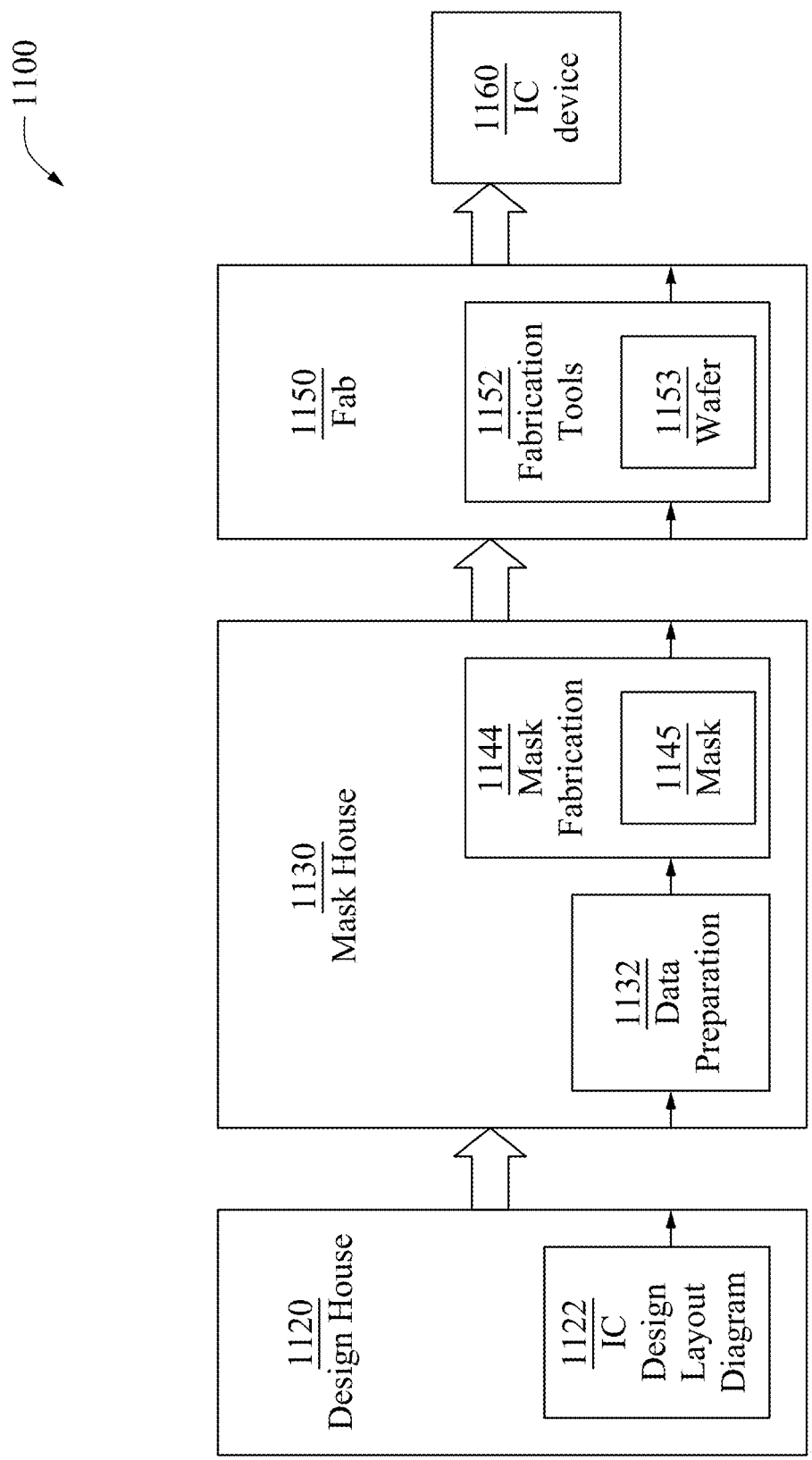
FIG. 11 is a block diagram of an integrated circuit (IC) manufacturing system, and an IC manufacturing flow associated therewith, in accordance with some embodiments.
Figure 12A:
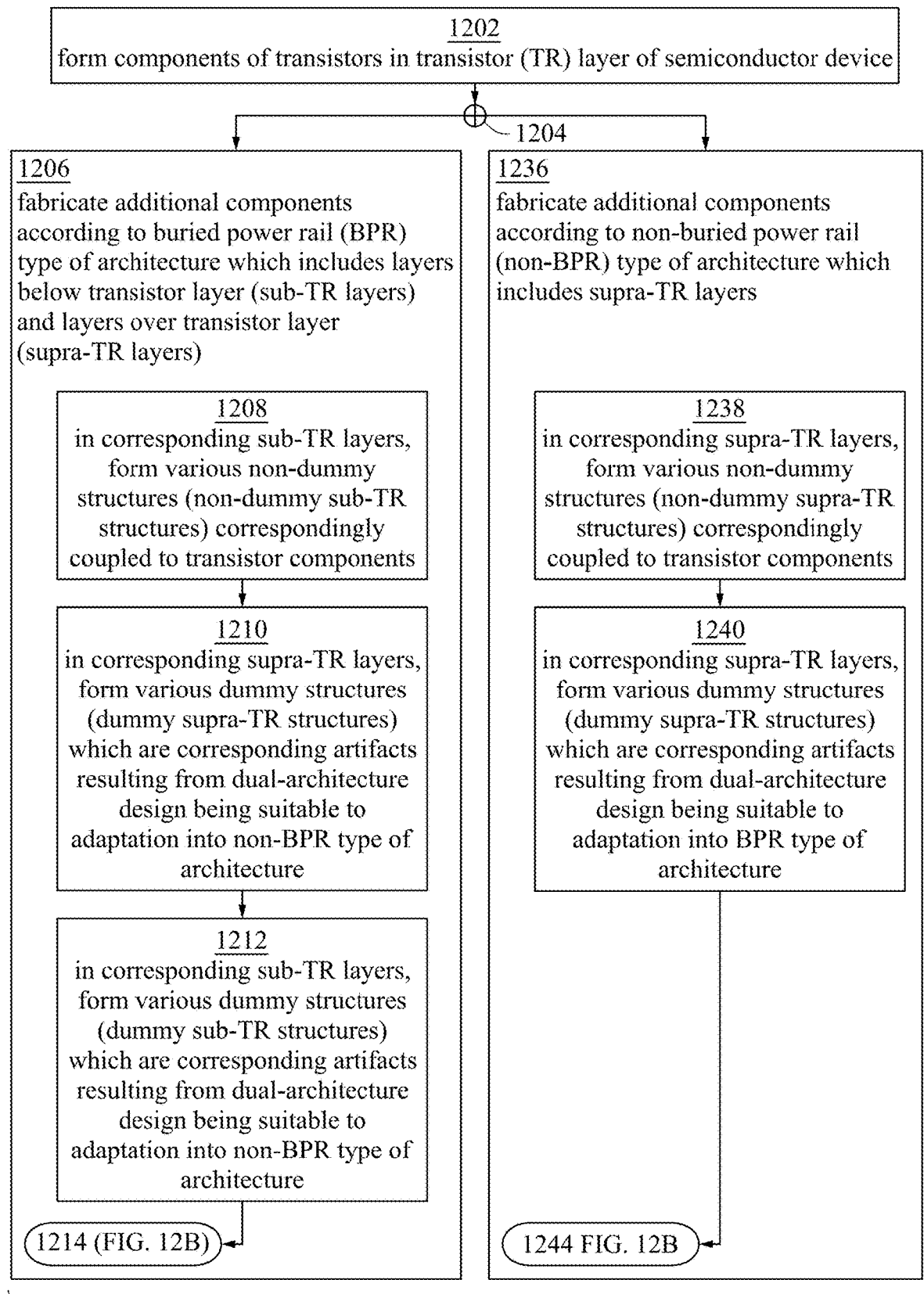
FIGS. 12A and 12B are flowcharts of a method of manufacturing a semiconductor device, in accordance with some embodiments.
Figure 12B:
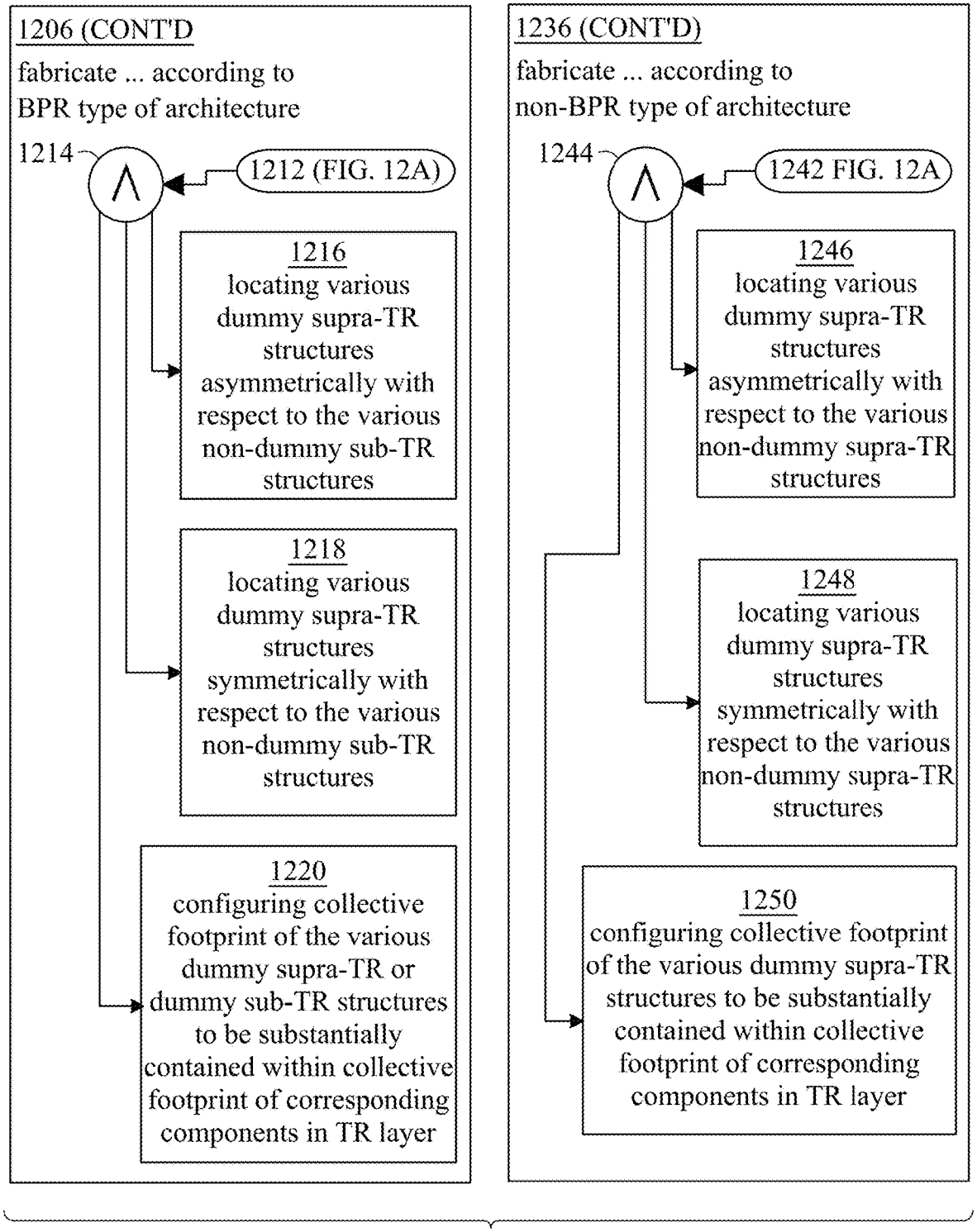

The method of FIGS. 12A-12B is implementable, for example, using integrated circuit (IC), manufacturing system 1100 (FIG. 11, discussed below), in accordance with some embodiments. Examples of a semiconductor device which can be manufactured according to method 800 include semiconductor device 100 of FIG. 1, semiconductor devices corresponding to various ones of the layout diagrams disclosed herein, or the like.

The method of FIGS. 12A-12B includes blocks 1202-1206 and 1236.

At block 1202, based on a single-architecture-compatible layout diagram which was generated by having pared down a dual-architecture-compatible, components of transistors are formed in the transistor layer of a semiconductor device. Examples of components formed in the transistor layer include components corresponding to the G, D, S or B terminals, or TTLV, of FIG. 2A, FIG. 2C, or the like. From block 1202, flow proceeds to block 1204.

At block 1204, flow can proceed to either block 1206 or block 1236, as indicated by block 1204 being shown as the logical Exclusive-OR-flow (XOR-flow) symbol. The discussion turns next to block 1206, but the discussion will return to block 1236. Accordingly, here, it is assumed that flow proceeds from block 1204 to block 1206.

Flow from block 1204 to block 1206 reflects that the single-architecture-compatible layout diagram has the BPR type of architecture which includes sub-TR layers and supra-TR layers. Accordingly, at block 1206, additional components are fabricated according to the BPR type of architecture which includes sub-TR layers and supra-TR layers. Examples of the BPR-type of architecture include semiconductor devices corresponding to the layout diagrams of FIGS. 2C, 3C, 4C, 5C, 6C, 7C, or the like. Block 1206 includes blocks 1280-1212. Flow proceeds to block 1208.

At block 1208, in corresponding sub-TR layers, various non-dummy sub-TR structures are formed and coupled to corresponding transistor components in the TR-layer. Examples of non-dummy sub-TR structures include structures corresponding to via pillar 210C(4) in FIG. 2C, via pillar 310C in FIG. 3C, via pillars 426C(1) and 426C(2) in FIG. 4C, SS_vias 510C(3) and 510C(4) in FIG. 5C, SS_vias 610C(4) and 610C(5) in FIG. 6C, SS_vias 710C(3) and 710C(4) in FIG. 7C, or the like. From block 1208, flow proceeds to block 1210.

At block 1210, in corresponding supra-TR layers, various dummy supra-TR structures are formed which are corresponding artifacts resulting from the dual-architecture design being suitable to adaptation into the non-BPR type of architecture. Examples of dummy supra-TR structures include structures corresponding to the supra-TR SS_via in column C1 of FIG. 2C, SS_vias 510C(1) and 510C(2) in FIG. 5C, SS_via 610(C) in FIG. 6C, or the like. From block 1210, flow proceeds to block 1212.

At block 1212, in corresponding sub-TR layers, various dummy sub-TR structures are formed which are corresponding artifacts resulting from the dual-architecture design being suitable to adaptation into the non-BPR type of architecture. Examples of dummy sub-TR structures include structures corresponding to sub-TR SS_via 610C(6) in FIG. 6C, or the like. From block 1212, flow proceeds to block 1214 of FIG. 12B.

At block 1214 of FIG. 12B, flow can proceed to either block 1216 or block 1218 or block 1220, as indicated by block 1204 being shown as the logical OR-flow symbol. The discussion turns next to block 1216, but the discussion will return to each of blocks 1218 and 1220. Accordingly, here, it is assumed that flow proceeds from block 1214 to block 1216.

At block 1216, the various dummy supra-TR structures are located asymmetrically with respect to the various non-dummy sub-TR structures. Examples of the dummy supra-TR structures being located asymmetrically with respect to the various non-dummy sub-TR structures include structures corresponding to dummy supra-TR SS_via 610C(3) which is located asymmetrically with respect to non-dummy sub-TR SS vias 610C(4) and 610C(5), or the like.

Assuming instead that flow proceeds from block 1214 to block 1218, then at block 1218, the various dummy supra-TR structures are located symmetrically with respect to the various non-dummy sub-TR structures. Examples of the dummy supra-TR structures being located symmetrically with respect to the various non-dummy sub-TR structures include structures corresponding to supra-TR SS_vias 510C(1) and 510C(2) which are located symmetrically with respect to sub-TR SS_vias 510C(3) and 510C(4) in FIG. 5C, or the like.

Assuming instead that flow proceeds from block 1214 to block 1220, then at block 1220, a collective footprint of the various dummy supra-TR structures and/or the various sub-TR structures are configured to be contained within a footprint of the corresponding components in the TR layer.

Returning the discussion to block 1204, it is now assumed instead that flow proceeds from block 1204 to block 1236. Examples of the collective footprint of the various dummy supra-TR structures being contained within the footprint of the corresponding components in the TR layer include the collective footprints of the dummy supra-TR structures corresponding to the layout diagrams of FIGS. 2C, 3C, 4C, 5C, 6C, 7C, or the like.

Flow from block 1204 to block 1206 reflects that the single-architecture-compatible layout diagram has the non-BPR type of architecture which includes supra-TR layers. Accordingly, at block 1236, additional components are fabricated according to the non-BPR type of architecture which includes supra-TR layers. Examples of the BPR-type of architecture include semiconductor devices corresponding to the layout diagrams of FIGS. 2B, 3B, 4B, 5B, 6B, 7B, or the like. Block 1236 includes blocks 1238-1240, 1244 and blocks 1246-1250. Flow proceeds to block 1238.

At block 1238, in corresponding supra-TR layers, various non-dummy supra-TR structures are formed and coupled to corresponding transistor components in the TR-layer. Examples of non-dummy supra-TR structures include structures corresponding to via pillar 212B and SS_via 210B in FIG. 2B, via pillar 312B in FIG. 3B, via pillars 412B(1) and 412B(2) and bottom terminal 422(2) and top terminal 422(1) in FIG. 4B, SS_vias 510B(1) and 510B(2) in FIG. 5B, SS_vias 610B(1), 610B(2) and 610B(3) in FIG. 6B, SS_vias 710B(1) and 710B(2) in FIG. 7B, or the like. From block 1238, flow proceeds to block 1244 of FIG. 12B.

At block 1244 of FIG. 12B, flow can proceed to either block 1246 or block 1248 or block 1250, as indicated by block 1244 being shown as the logical OR-flow symbol. The discussion turns next to block 1246, but the discussion will return to each of blocks 1248 and 1250. Accordingly, here, it is assumed that flow proceeds from block 1244 to block 1246.

At block 1246, the various dummy supra-TR structures are located asymmetrically with respect to the various non-dummy supra-TR structures. Examples of the dummy supra-TR structures being located asymmetrically with respect to the various non-dummy supra-TR structures include structures corresponding to dummy supra-TR SS_via 310B which is located asymmetrically with respect to non-dummy supra-TR via pillars 310B(1) and 310B(2), or the like.

Assuming instead that flow proceeds from block 1244 to block 1248, then at block 1248, the various dummy supra-TR structures are located symmetrically with respect to the various non-dummy supra-TR structures. Examples of the dummy supra-TR structures being located symmetrically with respect to the non-dummy supra-TR structures include structures corresponding to dummy supra-TR SS_vias 424B(1) and 424B(2) which are located symmetrically with respect to non-dummy supra-TR via pillars 412B(1) and 412B(2) in FIG. 4B, or the like.

Assuming instead that flow proceeds from block 1244 to block 1250, then at block 1250, a collective footprint of the various dummy supra-TR structures are configured to be contained within a footprint of the corresponding components in the TR layer. Examples of the collective footprint of the various dummy supra-TR structures being contained within the footprint of the corresponding components in the TR layer include the collective footprints of the dummy supra-TR structures corresponding to the layout diagrams of FIGS. 2B, 3B, 4B, 5B, 6B, 7B, or the like.

FIG. 10 is a block diagram of an electronic design automation (EDA) system 1000, in accordance with some embodiments.

In some embodiments, EDA system 1000 includes an automatic placement and routing (APR) system. Methods described herein of designing layout diagrams, in accordance with one or more embodiments, are implementable, for example, using EDA system 1000, in accordance with some embodiments.

In some embodiments, EDA system 1000 is a general purpose computing device including a hardware processor 1002 and a non-transitory, computer-readable storage medium 1004. Storage medium 1004, amongst other things, is encoded with, i.e., stores, computer program code 1006, i.e., a set of executable instructions. Execution of instructions 1006 by hardware processor 1002 represents (at least in part) an EDA tool which implements a portion or all of the methods described herein in accordance with one or more embodiments (hereinafter, the noted processes and/or methods).

Processor 1002 is electrically coupled to computer-readable storage medium 1004 via a bus 1008. Processor 1002 is also electrically coupled to an I/O interface 1010 by bus 1008. A network interface 1012 is also electrically connected to processor 1002 via bus 1008. Network interface 1012 is connected to a network 1014, so that processor 1002 and computer-readable storage medium 1004 are capable of connecting to external elements via network 1014. Processor 1002 is configured to execute computer program code 1006 encoded in computer-readable storage medium 1004 in order to cause system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause system 1000 (where such execution represents (at least in part) the EDA tool) to be usable for performing a portion or all of the noted processes and/or methods. In one or more embodiments, storage medium 1004 also stores information which facilitates performing a portion or all of the noted processes and/or methods. In one or more embodiments, storage medium 1004 stores library 1007 of standard cells including such standard cells as disclosed herein. In one or more embodiments, storage medium 1004 stores one or more layout diagrams 1009 corresponding to one or more layouts disclosed herein.

EDA system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

EDA system 1000 also includes network interface 1012 coupled to processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1000.

System 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. EDA system 1000 is configured to receive information related to a UI through I/O interface 1010. The information is stored in computer-readable medium 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1000. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

FIG. 11 is a block diagram of an integrated circuit (IC) manufacturing system 1100, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns designed for an IC device 1160. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file ("RDF"). Mask data preparation 1132 provides the RDF to mask fabrication 1144. Mask fabrication 1144 includes a mask writer. A mask writer converts the RDF to an image on a substrate, such as a mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1122.

It should be understood that the above description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 includes fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multi-level interconnects, and the like (formed at subsequent manufacturing steps).

Details regarding an integrated circuit (IC) manufacturing system (e.g., system 1100 of FIG. 11), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In an embodiment, a method of manufacturing a semiconductor device, the method including: forming, in a transistor (TR) layer, corresponding one or more components of one or more transistors; forming, in a corresponding contact layer which is over the transistor layer (supra-TR contact layer), one or more supra-TR contact structures corresponding to selected terminal portions among the one or more components of the one or more transistors; forming, in a corresponding contact layer which is under the transistor layer (sub-TR contact layer), one or more sub-TR contact structures corresponding to selected terminal portions among the one or more components of the one or more transistors; forming, in metallization layers and correspondingly interleaved interconnection layers which are over the supra-TR contact layer (supra-TR metallization layers and correspondingly interleaved supra-TR interconnection layers), one or more supra-TR stacks of corresponding supra-TR conductive segments and corresponding supra-TR via structures which represent one or more supra-TR via pillars for electrically coupling correspondingly to the one or more supra-TR contact structures; forming, in metallization layers and correspondingly interleaved interconnection layers which are under the sub-TR contact layer (sub-TR metallization layers and corresponding interleaved sub-TR interconnection layers), one or more sub-TR stacks of corresponding sub-TR conductive structures and corresponding sub-TR via structures which represent one or more sub-TR via pillars for electrically coupling correspondingly to the one or more sub-TR contact structures; forming, in a redistribution layer over an uppermost one of the supra-TR metallization layers (supra-TR redistribution layer), corresponding one or more supra-TR redistribution-via (supra-TR RV) structures for electrically coupling correspondingly to the one or more supra-TR stacks; forming, in a redistribution layer under an undermost one of the sub-TR metallization layers (sub-TR redistribution layer), corresponding one or more sub-TR redistribution-via (sub-TR RV) structures for electrically coupling correspondingly to the one or more sub-TR stacks; forming, in a supra-TR bond-pad layer over the supra-TR redistribution layer, corresponding one or more supra-TR bond pads for electrically coupling correspondingly to the one or more sub-TR RV structures; forming, in a sub-TR bond-pad layer under the sub-TR redistribution layer, corresponding sub-TR bond pads for electrically coupling correspondingly to the one or more sub-TR RV structures; and performing one of the following: if the semiconductor device is designated to have a buried power rail (BPR) type of architecture, removing at least some portions of the one or more sub-TR stacks in a range from a central supra-TR metallization layer up to the uppermost supra-TR metallization layer and in corresponding ones of the supra-TR interconnection layers, or at least some of the one or more supra-TR RV structures, or at least some of the one or more supra-TR bond pads; or if the semiconductor device is designated to have a non-buried power rail (non-BPR) type of architecture, removing at least some of the one or more sub-TR contact structures, or at least some of the one or more sub-TR RV structures, or at least some of the one or more sub-TR bond pads, or at least some portions of the one or more sub-TR stacks. In an embodiment, the removing at least some of the one or more of the sub-TR contact structures, or the one or more sub-TR RV structures, or the one or more sub-TR bond pads, or portions of the one or more sub-TR stacks removes: removes substantially all of the one or more sub-TR contact structures, the one or more sub-TR RV structures, the one or more sub-TR bond pads and the one or more sub-TR stacks.

In an embodiment, a semiconductor device includes: in a transistor (TR) layer, components of corresponding transistors (TR components); and in corresponding layers over the transistor layer (supra-TR layers): various non-dummy structures (non-dummy supra-TR structures) coupled to the transistor components and which are included because the semiconductor device has a non-buried power rail (non-BPR) type of architecture; and various dummy structures (dummy supra-TR structures) which are included as artifacts resulting from the semiconductor device being based on a dual-architecture-compatible design which is substantially equally suitable either to adaptation into the non-BPR type of architecture or adaptation into a BPR type of architecture.

In an embodiment, the semiconductor device further includes: in corresponding layers below the transistor layer (sub-TR layers): various dummy structures (dummy sub-TR structures) which are included as artifacts resulting from the semiconductor device being based on a dual-architecture-compatible design which is substantially equally suitable either to adaptation into the non-BPR type of architecture or adaptation into a BPR type of architecture. In an embodiment, the semiconductor device is a Metal-Insulator-Metal (MIM) capacitor; or the semiconductor device is a MIM diode. In an embodiment, the semiconductor device is: a decoupling capacitor circuit; a high resistance structure; a Metal-Oxide-Metal capacitor; a MOM diode; a Metal-Insulator-Metal (MIM) capacitor; or a MIM diode. In an embodiment, each of the TR layer and the supra-TR layers extends substantially in first and second directions which are perpendicular; the supra-TR layers are stacked in a third direction which is substantially perpendicular to each of the first and second directions; and relative to at least one of the first and second directions, the various dummy supra-TR structures are located asymmetrically with respect to the various non-dummy supra-TR structures. In an embodiment, the semiconductor device is: a decoupling capacitor (DE-CAP) circuit; a high resistance (HiR) structure; a Metal-Insulator-Metal (MIM) capacitor; or a MIM diode. In an embodiment, each of the TR layer and the supra-TR layers extends substantially in first and second directions which are perpendicular; the supra-TR layers are stacked in a third direction which is substantially perpendicular to each of the first and second directions; and relative to at least one of the first or second directions, the various dummy supra-TR structures are located symmetrically with respect to the various non-dummy supra-TR structures. In an embodiment, the semiconductor device is: a Metal-Oxide-Metal (MOM) capacitor; or a MOM diode. In an embodiment, each of the TR layer and the supra-TR layers extends substantially in first and second directions which are perpendicular; the sub-TR layers are stacked in a third direction which is substantially perpendicular to each of the first and second directions; as viewed from the third direction, a footprint of a given structure is an area relative to the first and second directions occupied by the given structure; and a collective footprint of the various dummy supra-TR structures is substantially contained within a collective footprint of the corresponding TR components.

In an embodiment, a semiconductor device includes: in a transistor (TR) layer, components of corresponding transistors (transistor components); and in corresponding layers below the transistor layer (sub-TR layers): various non-dummy structures (non-dummy sub-TR structures) coupled to the transistor components and which are included because the semiconductor device has a buried power rail (BPR) type of architecture; and in corresponding layers over the transistor layer (supra-TR layers): various dummy structures (dummy supra-TR structures) which are included for consistency with the semiconductor device otherwise being compatible with a non-buried power rail (non-BPR) type of architecture. In an embodiment, the semiconductor device is: an inductor; a Metal-Insulator-Metal (MIM) capacitor; or a MIM diode. In an embodiment, each of the TR layer, the sub-TR layers and the supra-TR layers extends substantially in first and second directions which are perpendicular; the sub-TR layers and the supra-TR layers are stacked in a third direction which is substantially perpendicular to each of the first and second directions; and relative to at least one of the first or second directions, the various dummy supra-TR structures are located asymmetrically with respect to the various non-dummy sub-TR structures. In an embodiment, the semiconductor device is: a Metal-Insulator-Metal (MIM) capacitor; or a MIM diode. In an embodiment, the semiconductor device further includes: in corresponding layers below the transistor layer (sub-TR layers): various dummy structures (dummy sub-TR structures) which would be consistent with the semiconductor device otherwise having the non-BPR type of architecture. In an embodiment, each of the TR layer, the sub-TR layers and the supra-TR layers extends substantially in first and second directions which are perpendicular; the sub-TR layers and the supra-TR layers are stacked in a third direction which is substantially perpendicular to each of the first and second directions; and relative to at least one of the first or second directions, the various dummy sub-TR structures are located asymmetrically with respect to the various non-dummy sub-TR structures. In an embodiment, the semiconductor device is: a Metal-Insulator-Metal (MIM) capacitor; or a MIM diode. In an embodiment, each of the TR layer, and the sub-TR layers and the supra-TR layers extends substantially in first and second directions which are perpendicular; the sub-TR layers and the supra-TR layers are stacked in a third direction which is substantially perpendicular to each of the first and second directions; and relative to at least one of the first or second directions, the various dummy supra-TR structures are located symmetrically with respect to the various non-dummy sub-TR structures. In an embodiment, the semiconductor device is an inductor. In an embodiment, each of the TR layer and the supra-TR layers extends substantially in first and second directions which are perpendicular; the sub-TR layers are stacked in a third direction which is substantially perpendicular to each of the first and second directions; as viewed from the third direction, a footprint of a given structure is an area relative to the first and second directions occupied by the given structure; and a collective footprint of the various dummy sub-TR structures is substantially contained within a collective footprint of the corresponding TR components. In an embodiment, the semiconductor device is a Metal-Insulator-Metal (MIM) capacitor; or the semiconductor device is a MIM diode.

In an embodiment, a method of manufacturing a semiconductor device based on a dual-architecture-compatible design includes: forming one or more components of one or more transistors in a transistor (TR) layer of the semiconductor device; and performing one of (A) fabricating additional components according to a buried power rail (BPR) type of architecture for the semiconductor device, the BPR type of architecture including layers below the transistor layer (sub-TR layers) and layers over the transistor layer (supra-TR layers); or (B) fabricating additional components according to a non-buried power rail (non-BPR) type of architecture for the semiconductor device, the non-BPR type of architecture including supra-TR layers; and wherein: the dual-architecture-compatible design is substantially equally suitable either to adaptation into the BPR type of architecture or adaptation into the non-BPR type of architecture; the (A) fabricating additional components according to a BPR type of architecture includes, in corresponding sub-TR layers, forming various non-dummy structures (non-dummy sub-TR structures) correspondingly coupled to the transistor components, and, in corresponding supra-TR layers, forming various dummy structures (dummy supra-TR structures) which are corresponding artifacts resulting from the dual-architecture-compatible design being suitable to adaptation into the non-BPR type of architecture; and the (B) fabricating additional components according to a non-BPR type of architecture includes, in corresponding supra-TR layers, forming various non-dummy structures (non-dummy supra-TR structures) correspondingly coupled to the transistor components, and forming various dummy structures (dummy supra-TR structures) which are corresponding artifacts resulting from the dual-architecture-compatible design being suitable to adaptation into the BPR type of architecture.

In some embodiments, each of the TR layer and the supra-TR layers extends substantially in first and second directions which are perpendicular; the supra-TR layers are stacked in a third direction which is substantially perpendicular to each of the first and second directions; and the (B) fabricating additional components according to a non-BPR type of architecture further includes relative to at least one of the first and second directions, locating the various dummy supra-TR structures asymmetrically with respect to the various non-dummy supra-TR structures, or, relative to at least one of the first or second directions, locating the various dummy supra-TR structures symmetrically with respect to the various non-dummy supra-TR structures. In some embodiments, each of the TR layer and the supra-TR layers extends substantially in first and second directions which are perpendicular; at least one of (A) the supra-TR layers or (B) the sub-TR layers are stacked in a third direction which is substantially perpendicular to each of the first and second directions; as viewed from the third direction, a footprint of a given structure is an area relative to the first and second directions occupied by the given structure; and the (A) fabricating additional components according to a BPR type of architecture further includes configuring a collective footprint of the various dummy sub-TR structures to be substantially contained within a collective footprint of the corresponding TR components; or the (B) fabricating additional components according to a non-BPR type of architecture further includes configuring a collective footprint of the various dummy supra-TR structures to be substantially contained within a collective footprint of the corresponding TR components. In some embodiments, the (A) fabricating additional components according to a BPR type of architecture further includes: in corresponding ones of the sub-TR layers, forming various dummy structures (dummy sub-TR structures) which would are corresponding artifacts resulting from of the dual-architecture-compatible design being suitable to adaptation into the non-BPR type of architecture. In some embodiments, each of the TR layer, the sub-TR layers and the supra-TR layers extends substantially in first and second directions which are perpendicular; the sub-TR layers and the supra-TR layers are stacked in a third direction which is substantially perpendicular to each of the first and second directions; and the (A) fabricating additional components according to a BPR type of architecture further includes relative to at least one of the first or second directions, locating the various dummy sub-TR structures asymmetrically with respect to the various non-dummy sub-TR structures or, relative to at least one of the first or second directions, locating the various dummy supra-TR structures symmetrically with respect to the various non-dummy sub-TR structures. In some embodiments, the (A) fabricating additional components according to a BPR type of architecture results in the semiconductor device being an inductor; a Metal-Insulator-Metal (MIM) capacitor; or a MIM diode.

In some embodiments, the (B) fabricating additional components according to a non-BPR type of architecture results in the semiconductor device being: a decoupling capacitor circuit; a high resistance structure; a Metal-Oxide-Metal (MOM) capacitor; or a MOM diode; a Metal-Insulator-Metal (MIM) capacitor; or a MIM diode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a semiconductor device based on a dual-architecture-compatible design, the method comprising:
    forming one or more components of one or more transistors in a transistor (TR) layer of the semiconductor device; and
    performing one of:
        (A) fabricating additional components according to a buried power rail (BPR) architecture for the semiconductor device, the BPR architecture including layers below the transistor layer (sub-TR layers) and layers over the transistor layer (supra-TR layers); or
        (B) fabricating additional components according to a non-buried power rail (non-BPR) architecture for the semiconductor device, the non-BPR architecture including supra-TR layers; and
    wherein:
        the dual-architecture-compatible design is substantially equally suitable either to adaptation into the BPR architecture or adaptation into the non-BPR architecture;
        the (A) fabricating additional components according to a BPR architecture includes:
            in corresponding sub-TR layers, forming various non-dummy structures (non-dummy sub-TR structures) correspondingly coupled to one or more of the one or more components of the one or more transistors; and
            in corresponding supra-TR layers, forming various dummy structures (dummy supra-TR structures) which are corresponding artifacts resulting from the dual-architecture-compatible design being suitable to adaptation into the non-BPR architecture; and
        the (B) fabricating additional components according to a non-BPR architecture includes:
            in corresponding supra-TR layers:
                forming various non-dummy structures (non-dummy supra-TR structures) correspondingly coupled to one or more of the one or more components of the one or more transistors; and
                forming various dummy structures (dummy supra-TR structures) which are corresponding artifacts resulting from the dual-architecture-compatible design being suitable to adaptation into the BPR architecture.

2. The method of claim 1, wherein:
    each of the TR layer and the supra-TR layers extends substantially in first and second directions which are perpendicular;
    the supra-TR layers are stacked in a third direction which is substantially perpendicular to each of the first and second directions; and
    the (B) fabricating additional components according to a non-BPR architecture further includes:
        relative to at least one of the first and second directions, locating the various dummy supra-TR structures asymmetrically with respect to the various non-dummy supra-TR structures; or
        relative to at least one of the first or second directions, locating the various dummy supra-TR structures symmetrically with respect to the various non-dummy supra-TR structures.

3. The method of claim 1, wherein:
    each of the TR layer and the supra-TR layers extends substantially in first and second directions which are perpendicular;
    at least one of (A) the supra-TR layers or (B) the sub-TR layers are stacked in a third direction which is substantially perpendicular to each of the first and second directions;
    as viewed from the third direction, a footprint of a given structure is an area relative to the first and second directions occupied by the given structure; and
    the (A) fabricating additional components according to a BPR architecture further includes:

configuring a collective footprint of the various dummy sub-TR structures to be substantially contained within a collective footprint of the corresponding TR components; or the (B) fabricating additional components according to a non-BPR architecture further includes:

configuring a collective footprint of the various dummy supra-TR structures to be substantially contained within a collective footprint of the corresponding TR components.

4. The method of claim 1, wherein the (A) fabricating additional components according to a BPR architecture further includes:

in corresponding ones of the sub-TR layers,
forming various dummy structures (dummy sub-TR structures) which are corresponding artifacts resulting from of the dual-architecture-compatible design being suitable to adaptation into the non-BPR architecture.

5. The method of claim 4, wherein:

each of the TR layer, the sub-TR layers and the supra-TR layers extends substantially in first and second directions which are perpendicular;

the sub-TR layers and the supra-TR layers are stacked in a third direction which is substantially perpendicular to each of the first and second directions; and the (A) fabricating additional components according to a BPR architecture further includes:

relative to at least one of the first or second directions, locating the various dummy sub-TR structures asymmetrically with respect to the various non-dummy sub-TR structures; or relative to at least one of the first or second directions, locating the various dummy supra-TR structures symmetrically with respect to the various non-dummy sub-TR structures.

6. The method of claim 1, wherein:

the (A) fabricating additional components according to a BPR architecture results in the semiconductor device being:

an inductor;
a Metal-Insulator-Metal (MIM) capacitor; or
a MIM diode.

7. The method of claim 1, wherein:

the (B) fabricating additional components according to a non-BPR architecture results in the semiconductor device being:

a decoupling capacitor circuit;
a high resistance structure;
a Metal-Oxide-Metal (MOM) capacitor;
a MOM diode;
a Metal-Insulator-Metal (MIM) capacitor; or
a MIM diode.

8. A semiconductor device comprising:

in a transistor (TR) layer, components of corresponding transistors (TR components); and in corresponding layers over the transistor layer (supra-TR layers):

various non-dummy structures (non-dummy supra-TR structures) coupled to the TR components and which are included because the semiconductor device has a non-buried power rail (non-BPR) architecture; and various dummy structures (dummy supra-TR structures) which are included as artifacts resulting from the semiconductor device being based on a dual-architecture-compatible design which is substantially equally suitable either to adaptation into the non-BPR architecture or adaptation into a buried power rail (BPA) architecture.

9. The semiconductor device of claim 8, further comprising:

in corresponding layers below the transistor layer (sub-TR layers):

various dummy structures (dummy sub-TR structures) which are included as artifacts resulting from the dual-architecture-compatible design being suitable to adaptation into the BPR architecture.

10. The semiconductor device of claim 8, wherein:

each of the TR layer and the supra-TR layers extends substantially in first and second directions which are perpendicular;

the supra-TR layers are stacked in a third direction which is substantially perpendicular to each of the first and second directions; and relative to at least one of the first and second directions, the various dummy supra-TR structures are located asymmetrically with respect to the various non-dummy supra-TR structures.

11. The semiconductor device of claim 10, wherein:

the semiconductor device is:
a decoupling capacitor circuit;
a high resistance structure;
a Metal-Insulator-Metal (MIM) capacitor; or
a MIM diode.

12. The semiconductor device of claim 8, wherein:

each of the TR layer and the supra-TR layers extends substantially in first and second directions which are perpendicular;

the supra-TR layers are stacked in a third direction which is substantially perpendicular to each of the first and second directions; and relative to at least one of the first or second directions, the various dummy supra-TR structures are located symmetrically with respect to the various non-dummy supra-TR structures.

13. The semiconductor device of claim 8, wherein:

each of the TR layer and the supra-TR layers extends substantially in first and second directions which are perpendicular;

the supra-TR layers are stacked in a third direction which is substantially perpendicular to each of the first and second directions;

as viewed from the third direction, a footprint of a given structure is an area relative to the first and second directions occupied by the given structure; and a collective footprint of the various dummy supra-TR structures is substantially contained within a collective footprint of the corresponding TR components.

14. A semiconductor device comprising:

in a transistor (TR) layer, components of corresponding transistors (TR components); and in corresponding layers below the transistor layer (sub-TR layers):

various non-dummy structures (non-dummy sub-TR structures) coupled to the transistor components and which are included because the semiconductor device has a buried power rail (BPR) architecture; and in corresponding layers over the transistor layer (supra-TR layers):

various dummy structures (dummy supra-TR structures) which are included as artifacts resulting from the semiconductor device being based on a dual-architecture-compatible design which is substantially equally suitable either to adaptation into the BPR architecture or adaptation into a non-BPR architecture.

15. The semiconductor device of claim 14, further comprising:
in corresponding layers below the transistor layer:
various dummy structures (dummy sub-TR structures) which would be consistent with the semiconductor device otherwise having the non-BPR architecture.

16. The semiconductor device of claim 15, wherein:
each of the TR layer, the sub-TR layers and the supra-TR layers extends substantially in first and second directions which are perpendicular;
the sub-TR layers and the supra-TR layers are stacked in a third direction which is substantially perpendicular to each of the first and second directions; and
relative to at least one of the first or second directions, the various dummy sub-TR structures are located symmetrically with respect to the various dummy sub-TR structures.

17. The semiconductor device of claim 16, wherein:
the semiconductor device is:
a Metal-Insulator-Metal (MIM) capacitor; or
a MIM diode.

18. The semiconductor device of claim 14, wherein:
each of the TR layer, and the sub-TR layers and the supra-TR layers extends substantially in first and second directions which are perpendicular;
the sub-TR layers and the supra-TR layers are stacked in a third direction which is substantially perpendicular to each of the first and second directions; and
relative to at least one of the first or second directions, the various dummy supra-TR structures are located asymmetrically with respect to the various non-dummy sub-TR structures.

19. The semiconductor device of claim 14, wherein:
each of the TR layer and the supra-TR layers extends substantially in first and second directions which are perpendicular;
the sub-TR layers are stacked in a third direction which is substantially perpendicular to each of the first and second directions;
as viewed from the third direction, a footprint of a given structure is an area relative to the first and second directions occupied by the given structure; and
a collective footprint of the various dummy supra-TR structures is substantially contained within a collective footprint of the corresponding transistor components.

20. The semiconductor device of claim 14, wherein:
each of the TR layer, the sub-TR layers and the supra-TR layers extends substantially in first and second directions which are perpendicular;
the sub-TR layers and the supra-TR layers are stacked in a third direction which is substantially perpendicular to each of the first and second directions; and
relative to at least one of the first or second directions, the various dummy supra-TR structures are located asymmetrically with respect to the various non-dummy sub-TR structures.

* * * * *